United States Patent
Brittner et al.

(10) Patent No.: US 6,859,340 B2
(45) Date of Patent: Feb. 22, 2005

(54) METHOD AND DEVICE FOR RETRACTING AN ACTUATOR

(75) Inventors: Rodney Brittner, Longmont, CO (US); Paul J. Throckmorton, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 396 days.

(21) Appl. No.: 10/021,883

(22) Filed: Dec. 13, 2001

(65) Prior Publication Data

US 2002/0141101 A1 Oct. 3, 2002

Related U.S. Application Data

(60) Provisional application No. 60/274,441, filed on Mar. 9, 2001.

(51) Int. Cl.$^7$ ............................................. G11B 21/02
(52) U.S. Cl. ...................................................... 360/75
(58) Field of Search .......................................... 360/75

(56) References Cited

U.S. PATENT DOCUMENTS

| | | |
|---|---|---|
| 3,473,099 A | 10/1969 | Miller |
| 3,626,264 A | 12/1971 | Halfhill et al. |
| 3,629,679 A | 12/1971 | Halfhill et al. |
| 4,202,020 A | 5/1980 | Lovgren et al. |
| 4,237,501 A | 12/1980 | Barmache et al. |
| 4,275,343 A | 6/1981 | Fulton et al. |
| 4,371,818 A | 2/1983 | Lewis |
| 4,371,903 A | 2/1983 | Lewis .......................... 360/75 |
| 4,679,102 A | 7/1987 | Wevers et al. |
| 4,831,469 A | 5/1989 | Hanson et al. |
| 5,384,524 A | 1/1995 | Romano |
| 5,473,238 A | 12/1995 | Latham, II et al. |
| 5,486,957 A | 1/1996 | Albrecht ....................... 360/75 |
| 5,504,402 A | 4/1996 | Menegoli |
| 5,654,848 A | 8/1997 | Maiers et al. |
| 5,675,230 A | 10/1997 | Dunfield |
| 5,729,399 A | 3/1998 | Albrecht et al. |
| 5,754,369 A | 5/1998 | Balakrishnan |
| 6,016,234 A | 1/2000 | Blank et al. ................... 360/75 |
| 6,025,968 A | 2/2000 | Albrecht ....................... 360/75 |
| 6,040,671 A | 3/2000 | Brito et al. .................. 318/603 |
| 6,064,539 A | 5/2000 | Null et al. ..................... 360/75 |
| 6,081,400 A | 6/2000 | Lu et al. |
| 6,140,784 A | * 10/2000 | Mazda ......................... 318/280 |
| 6,184,645 B1 | 2/2001 | Brito et al. .................. 318/632 |
| 6,236,527 B1 | 5/2001 | Uchiike et al. ................ 360/75 |
| 6,316,898 B1 | * 11/2001 | Albrecht et al. ............. 318/560 |
| 6,512,650 B1 | * 1/2003 | Tanner ......................... 360/75 |
| 6,563,666 B1 | * 5/2003 | LaPanse .................. 360/78.09 |
| 6,590,732 B2 | * 7/2003 | Kitagawa et al. ............. 360/75 |

FOREIGN PATENT DOCUMENTS

| | | |
|---|---|---|
| GB | 1259926 | 1/1972 |
| GB | 2 121 589 A | 12/1983 |
| JP | 54075018 | 6/1979 |
| JP | 58045670 | 3/1983 |

OTHER PUBLICATIONS

Article, IBM magnetic hard disk drive load/unload technology.

* cited by examiner

Primary Examiner—David Hudspeth
Assistant Examiner—Mitchell Slavitt
(74) Attorney, Agent, or Firm—Derek J. Berger

(57) ABSTRACT

An actuator retract system and method for moving read/write heads from data regions on discs to non-data locations in a disc drive is disclosed. The non-data locations may be on or in close proximity to the discs. The non-data locations may be a landing zone or a load/unload ramp. At disc drive power-down, power generated from the rotational inertia in rotating discs is used to supply a current to a coil of a voice coil motor operably coupled to the actuator. During such power-down operation, a desired velocity is maintained using acceleration or deceleration, when necessary. The current generates an electric field around the coil that interacts with a magnetic field in the voice coil motor to move the actuator such that the read/write heads are retracted to the non-data location.

27 Claims, 11 Drawing Sheets

METHOD AND DEVICE FOR RETRACTING AN ACTUATOR

RELATED APPLICATIONS

This application claims priority of U.S. provisional application Ser. No. 5 60/274,441 entitled "Low Cost, Constant Velocity Retract Design and Apparatus," filed Mar. 9, 2001.

FIELD OF THE INVENTION

This application relates generally to data storage devices and more particularly, but not by way of limitation, to supplying power from a spindle motor to an actuator assembly in a disc drive system.

BACKGROUND OF THE INVENTION

Modern hard disc drives comprise one or more rigid discs that are coated with a magnetizable medium and mounted on a spindle hub of a spindle motor for rotation at a high speed. Information is read from and written to each disc in a plurality of concentric tracks by a read/write head mounted on an actuator arm. The outside circumference of each disc is referred to as the "outer diameter" (OD), and the region of each disc near the spindle hub is referred to as the "inner diameter" (ID). A read/write head is said to "fly" over the disc surface as the disc rotates. When disc rotational velocity decreases, the layer of air supporting read/write head above the disc surface diminishes and the head descends toward the disc surface. However, contact between a read/write head and the disc surface can damage the magnetizable medium and the head. Furthermore, through a phenomenon called "stiction," a read/write head can become temporarily "stuck" to the disc surface after contact with the disc surface. Stiction can damage the magnetizable medium, the read/write head, and/or the actuator arm when the disc drive system initiates disc rotation in an attempt to move the read/write head from the disc surface.

One approach to addressing this problem is to land the read/write head on a textured landing zone, preferably near the ID of the disc. Typically, data are not recorded in the landing zone, and the texturing of the landing zone surface minimizes stiction. The actuator arm is moved to an ID landing zone from data areas on the disc when the rotational velocity of the disc is decreased, thereby avoiding contact with the data areas of the disc. The read/write head is moved back to the data areas of the disc when the rotational velocity increases to allow the head to fly above the disc surface.

An alternative approach is to unload the read/write head by moving the actuator arm onto a ramp, preferably positioned outside the OD of the disc. The ramp supports the read/write head outside the diameter of the disc and prevents contact between the head and the disc surface. An actuator arm typically sweeps a 25° arc from ID to OD to access tracks on a disc; however, the ramp feature can increase the total sweep (i.e., stroke) required of the actuator arm and a voice coil motor (VCM) to approximately 50°. Furthermore, the ramp presents additional resistance to the movement of the actuator arm, because the arm must ascend the sloped surface of the ramp, which also introduces an additional friction component.

To move read/write heads from data regions to non-data locations, e.g., a ramp or landing zone, conventional actuator retract systems may utilize power provided by kinetic energy generated as the discs of the disc assembly continue spinning at disc drive power-down. Disc drive power-down may be used to identify not only power shut off to the disc drive, but also situations where power is shut off to a spindle motor supplying power to a spindle hub rotating the discs during normal disc drive operation. As power is shut off to the spindle motor, a back electromotive force ($V_{BEMF}$) is produced across windings of the spindle motor as the discs spin down. The back electromotive force across the windings generates alternating currents that may be used to generate an electric field in a voice coil motor (VCM) operably connected to the actuator assembly. The electric field interacts with a magnetic field of the VCM to move the actuator assembly such that the read/write heads of the assembly are retracted away from data regions and toward non-data location on or in close proximity to the discs.

During disc drive power-down, there exists only a finite time to retract the read/write heads to either a landing zone or a load/unload ramp, depending on the disc drive configuration. Thus, it is important to move the read/write heads away from data regions on the discs at a relatively high velocity in view of the actual positional displacement of the heads. However, by retracting the read/write heads at such great velocities, the probability that particles from a head may be dislodged from the head and onto a data region on a disc is heightened. As such, a relatively high retract velocity may result in hard errors on one or more data regions on the discs.

To address this problem, conventional actuator retract systems employ an amplifier to directly measure a back electromotive force across the VCM ($V_{VCM}$) as the actuator arms, and thus the read/write heads attached thereto, are retracted toward the non-data location. While these conventional systems may accomplish the task of limiting the retract velocity of the read/write heads across the discs, they are not without problems. First, the circuitry employed in conventional velocity limiting actuator retract systems is often complex in design. As such, these conventional systems are not only expensive to design and manufacture, but are associated with routine implementation errors that may be harmful to the overall operation of the disc drive. Second, transition into and out of the $V_{VCM}$ sampling period by this circuitry involves unnecessarily large and steep transitions in the $V_{VCM}$ waveform versus time, thereby resulting in irregular rates of torque applied to the actuator arms over time. These irregular rates in torque often excite components within the disc drive thereby causing the components to vibrate, which results in undesirable high levels of acoustical noise in disc drives.

SUMMARY OF THE INVENTION

Against this backdrop the present invention has been developed. The present invention is a method and system for positionally displacing read/write heads of an actuator assembly at a constant velocity. More particularly, the present invention relates to retracting the read/write heads of the actuator assembly from data regions on the discs to non-data locations on or in close proximity to the discs. A constant velocity may be defined not only as a finite retract velocity of the read/write heads retracting across the discs, but also as a selected velocity range to which the retract velocity is maintained between upper and lower limits of the selected velocity range. As such, in accordance with one embodiment, the read/write heads are moved to non-data locations at a retract velocity that is between upper and lower limits of a desired retract velocity.

In accordance with an embodiment of the invention, current used in generating power to move the actuator assembly is provided by kinetic energy generated at power-down. As power is shut off to a spindle motor supplying power to a spindle hub rotating the discs during normal operation of the disc drive, a back electromotive force ($V_{BEMF}$) is produced across windings of the spindle motor. The back electromotive force across the windings generates alternating currents that may be used to generate an electric field in a voice coil motor (VCM) operably connected to the actuator assembly. The electric field interacts with a magnetic field of the VCM to move the actuator assembly such that the read/write heads of the assembly are retracted away from data regions and toward non-data locations on or in close proximity to the discs about, i.e., between upper and lower limits of, a desired retract velocity.

In accordance with still other embodiments of the present invention, a rectifier may rectify the AC currents generated in the coils of the spindle motor. The resulting current, which may be referred to as a "control current," is supplied to an H-bridge circuit responsible for applying the control current to the coil of the VCM. As the control current is applied to the coil, an electric field is generated around the coil that interacts with the magnetic field of the VCM to produce movement by the actuator assembly, and thus the read/write heads. The direction that the current enters the coil controls whether the rate of displacement by the heads is either accelerated or decelerated toward the non-data locations.

At times when the control current is in a zero magnitude phase, a back electromotive force ($V_{VCM}$) is generated across the coil of the VCM as the read/write heads continue to retract toward the data regions. $V_{VCM}$ may be measured and input to a control system to determine whether the rate of positional displacement by the read/write heads should be accelerated or decelerated in order to maintain the retract velocity about the desired retract velocity. As such, $V_{VCM}$ may be compared to a threshold voltage ($V_{TH}$) representative of the desired retract velocity. If $V_{VCM}$ is less than $V_{TH}$, the control current may be applied by the H-bridge circuit in an opposite direction through the coil than if $V_{VCM}$ is greater than $V_{TH}$. Thus, the H-bridge circuit effectively maintains a constant retract velocity of the read/write heads by allowing current to flow through opposite directions in the coil as the heads are being retracted toward the non-data locations. By allowing this bi-directional flow of current through the coil, the positional displacement of the actuator arms, and thus the read/write heads, may be accelerated or decelerated, thereby resulting in increasing or decreasing velocity, respectively toward non-data locations on or in close proximity to the discs. By controlling the velocity in this manner, the present invention retracts the read/write heads across the discs about the desired retract velocity in accordance with an embodiment of the present invention. Such a relatively constant retract velocity may be achieved by relatively slowly changing torque profiles that effectively minimize the vibration of components of the disc drive thereby resulting in lower levels of acoustical noise in the disc drive.

The present invention also can be implemented as a computer-readable program storage device which tangibly embodies a program of instructions executable by a computer system to positionally displace read/write heads of an actuator assembly at a constant velocity.

These and various other features as well as advantages which characterize the present invention will be apparent from a reading of the following detailed description and a review of the associated drawings.

DETAILED DESCRIPTION

Figure 1:
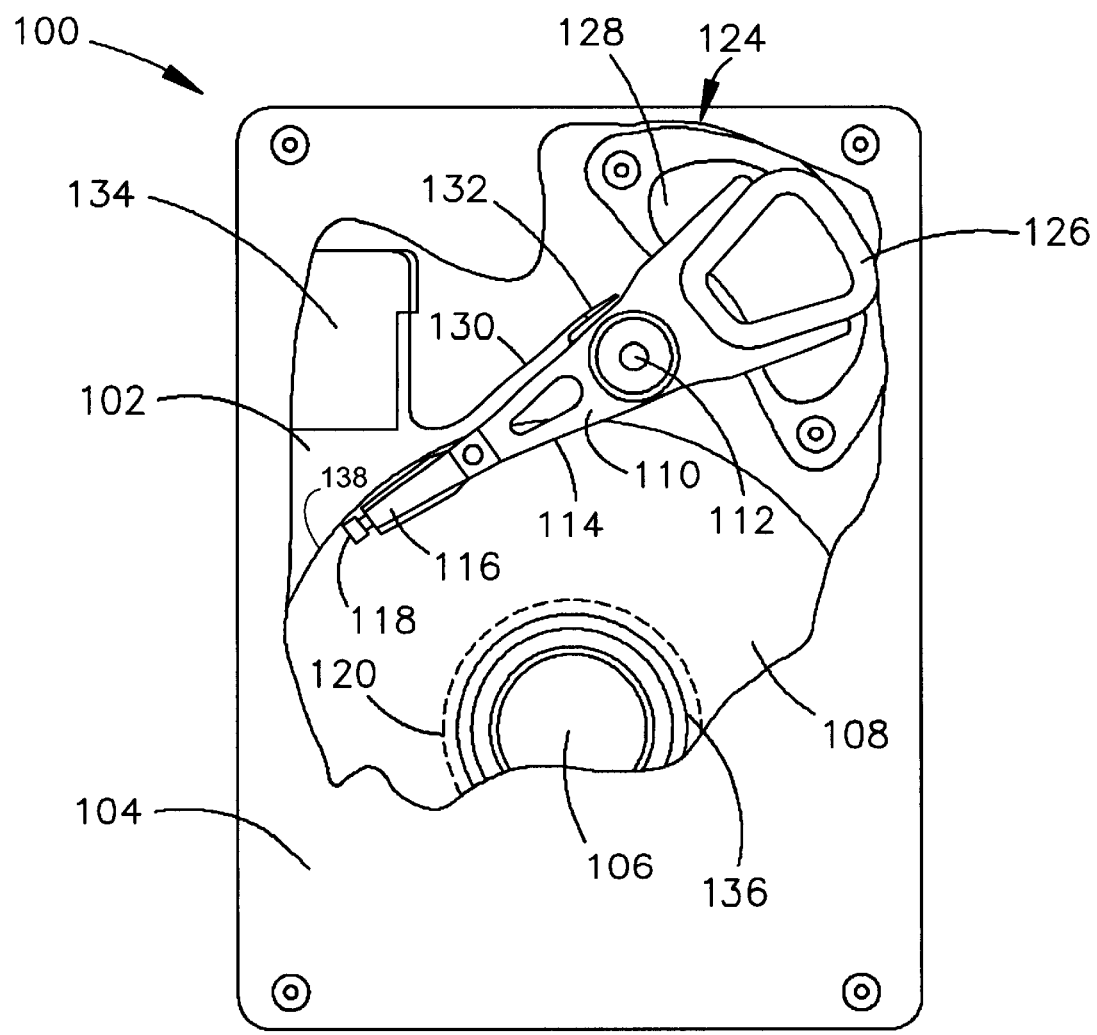
FIG. 1 is a plan view of a disc drive illustrating a first embodiment of the present invention and showing the primary internal components of the disc drive.

The present invention and its various embodiments are described in detail below with reference to the figures. When referring to the figures, like structures and elements shown throughout are indicated with like reference numerals.

Figure 2:
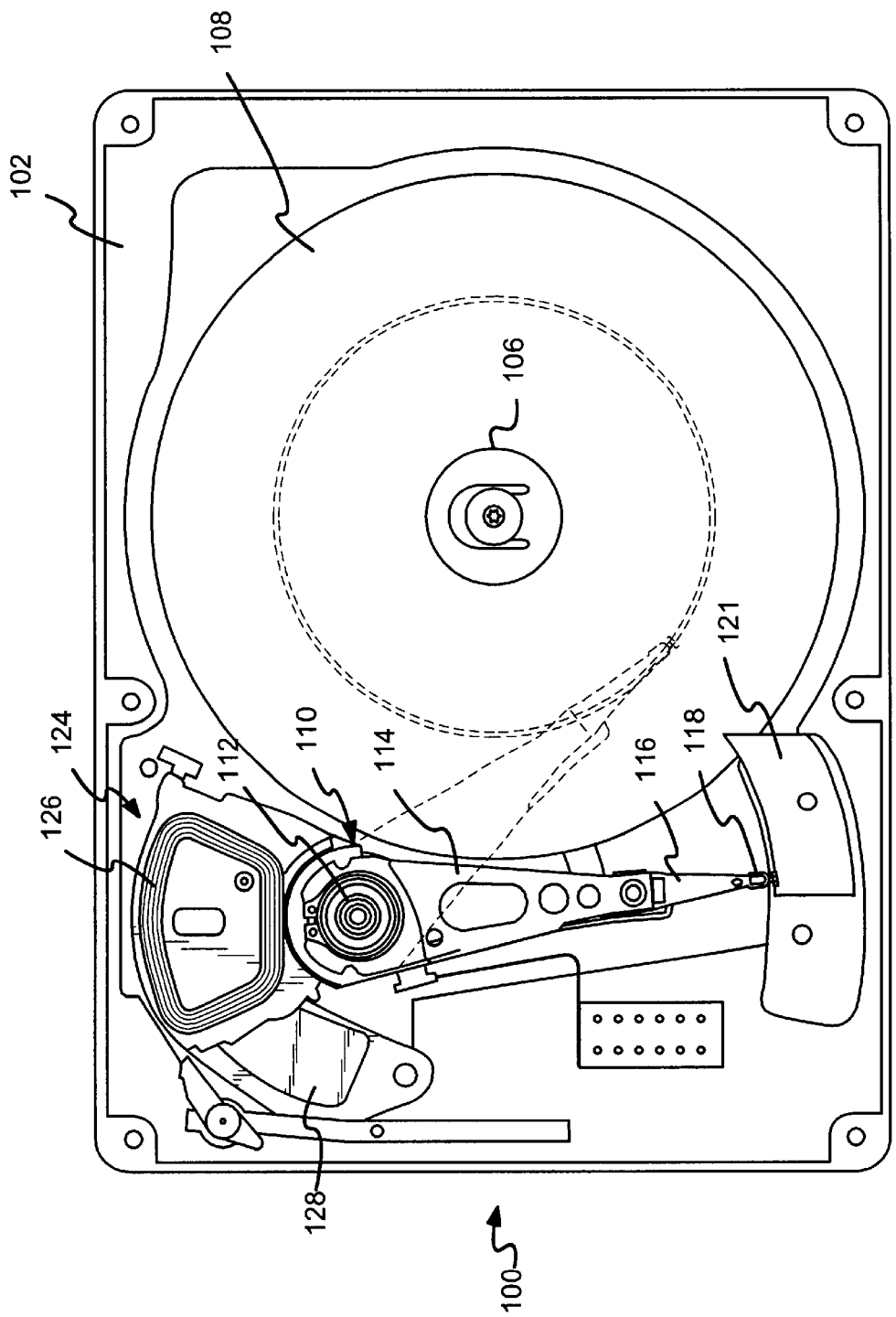
FIG. 2 is a plan view of a disc drive illustrating a second embodiment of the present invention and showing the primary internal components of the disc drive.

A disc drive 100 constructed in accordance with alternative embodiments of the present invention is shown in FIGS. 1 and 2. In particular, FIG. 1 shows a disc drive 100 in accordance with a first embodiment of the present invention and FIG. 2 shows a disc drive 100 in accordance with a second embodiment of the present invention. Because the disc drives 100 shown in FIG. 1 and FIG. 2 are substantially identical, with only a few notable exceptions, these two figures are described in tandem below.

The disc drive 100 includes a base 102 to which various components of the disc drive 100 are mounted. A top cover 104 (FIG. 1), shown partially cut away, cooperates with the base 102 to form an internal, sealed environment for the disc drive 100 in a conventional manner. The components include a spindle motor 156 (FIG. 4) which rotates one or more discs 108 attached to a spindle hub 106 of the spindle motor 156 at a constant high speed. A magnetic media disc 108 is used to illustrate a preferred embodiment of the present invention, but the present invention may be implemented using other types of data storage discs. Information is written to and read from tracks 306 (FIG. 3) on the discs 108 through the use of an actuator assembly 110, which rotates about a bearing shaft assembly 112 positioned adjacent to the discs 108. The actuator assembly 110 includes a plurality of actuator arms 114 which extend toward the discs 108, with one or more flexures 116 extending from each of the actuator arms 114. Mounted at the distal end of each of the flexures 116 is a transducer, or read/write head, 118, which includes an air bearing slider enabling the read/write head 118 to fly in close proximity above the corresponding surface of the associated disc 108.

The spindle motor 156 is typically de-energized when the disc drive 100 is not in use for extended periods of time. In accordance with a first embodiment of the present invention shown in FIG. 1, the read/write heads 118 may be moved over park, or landing, zones 120 near the inner diameter (ID) 136 of the discs 108 when the drive motor 156 is de-energized. The read/write heads 118 may be secured over the landing zones 120 through the use of an actuator latch arrangement, which prevents inadvertent rotation of the actuator assembly 110 when the heads 118 are parked. Although the landing zone 120 is shown in FIG. 1 as being located in close proximity to the ID 136 of the discs 108, a landing zone 120 may also be located in close proximity to an outer diameter (OD) 138 of the discs 108. Furthermore, a landing zone 120 may be located on any portion of the discs 108 between the OD 138 and the ID 136 of the discs 108. In accordance with a second embodiment of the present invention shown in FIG. 2, the actuator arms 114 may be rotated clockwise from the position shown in dashed lines in FIG. 2 to move the heads 118 over and onto load/unload ramps 121 to park positions off of the discs 108 when the spindle motor 156 is de-energized. As such, the read/write heads 118 may be secured by the ramps 121 to prevent inadvertent rotation of the actuator assembly 110 when the discs 108 are spinning at a velocity insufficient to maintain an air bearing between the sliders and the discs 108. The heads 118 are maintained on the ramps 121 in the park position through the use of an actuator latch arrangement, which prevents inadvertent rotation of the actuator arms 114 when the heads are parked. This latch arrangement may be a magnetic latch which magnetically holds the actuator against a stop.

Referring collectively to FIGS. 1 and 2, the radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112 and the heads 118 are caused to move across the surfaces of the discs 108.

A flex assembly 130 (only shown in FIG. 1) provides the requisite electrical connection paths for the actuator assembly 110 while allowing pivotal movement of the actuator assembly 110 during operation. The flex assembly 130 includes a printed circuit board 132 (only shown in FIG. 1) to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 (FIG. 1) for communication through the base deck 102 to a disc drive printed circuit board (not shown) mounted to the bottom side of the disc drive 100.

Figure 3:
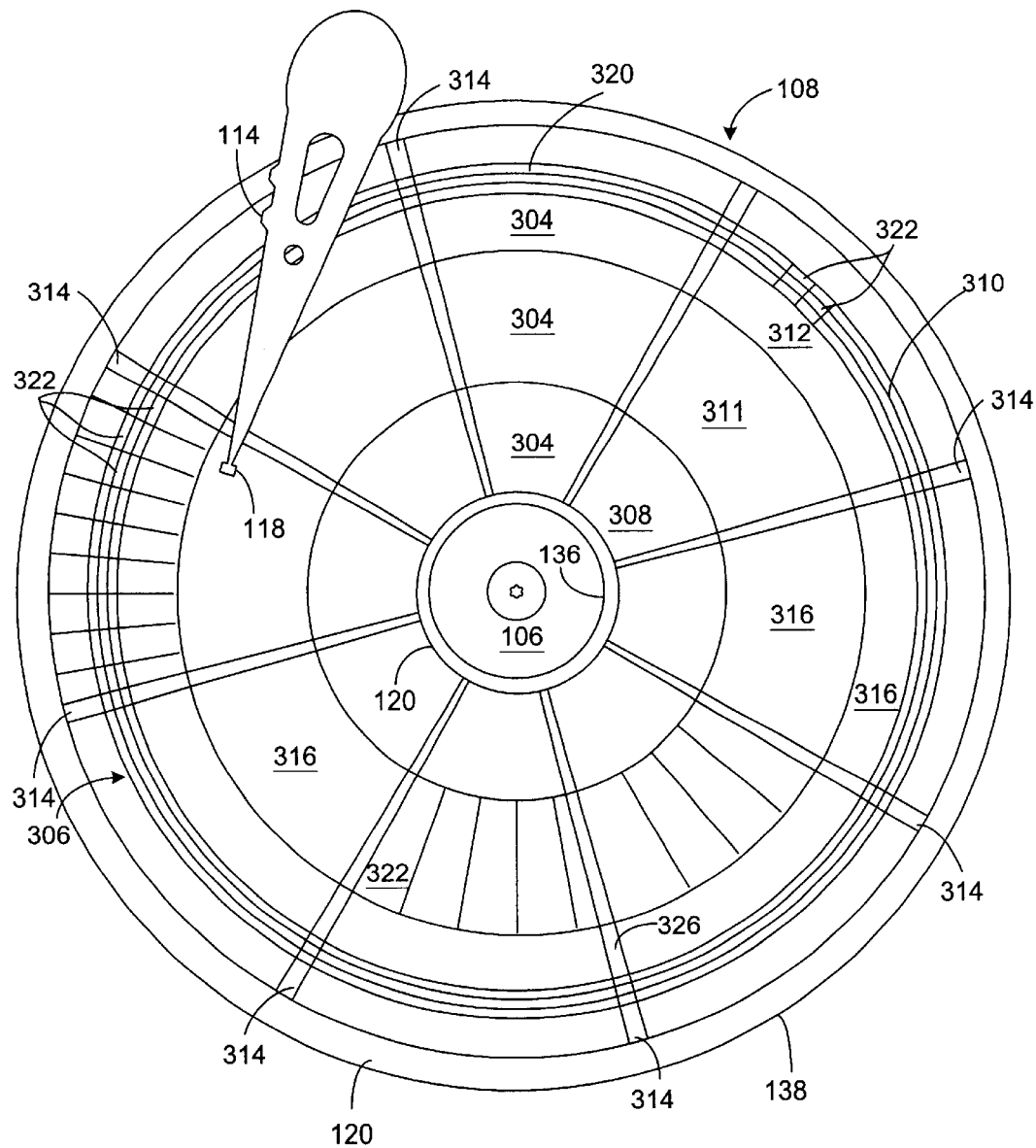
FIG. 3 is a plan view of the disc shown in FIGS. 1 and 2 generally showing the main components on the surface of the disc.

FIG. 3 shows the logical recording structure of an exemplary disc 108 of the disc drive 100. The disc 108 is divided into several concentric disc zones 304 which contain regions of adjacent tracks 306. For example, the magnetic disc 108 of FIG. 3 includes an inner zone 308, a center zone 311, and an outer zone 312. Because the concentric disc zones 304 are the regions of the disc 108 where data is stored, the zones 304 may be referred to as "data regions." In contrast, because data is not stored on either landing zones 120 (FIG. 1) or load/unload ramps 121 (FIG. 2), the zones 120 and ramps 121 may be referred to as non-data locations.

Figure 4:
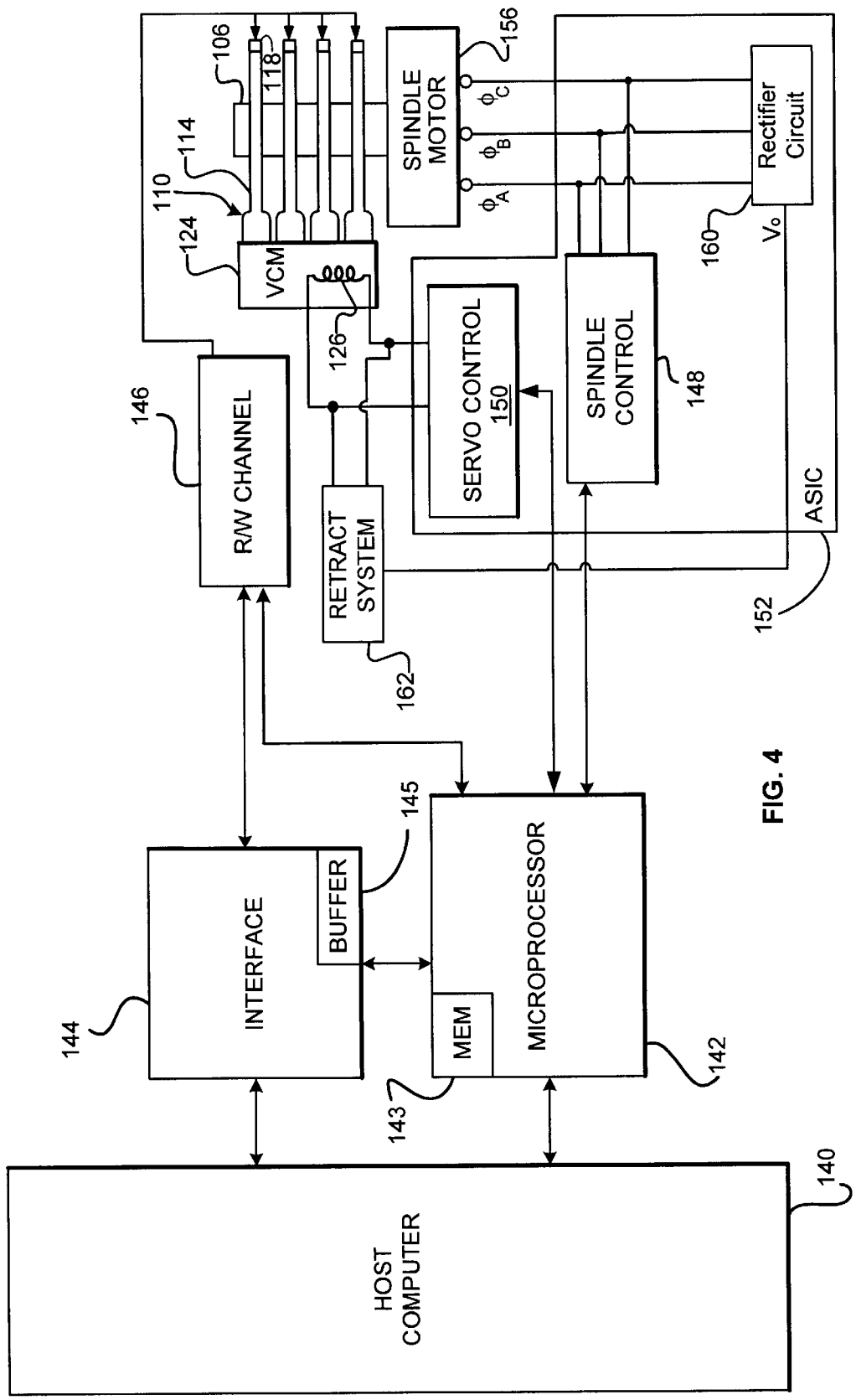
FIG. 4 is a functional block diagram generally showing the main functional components used to control the disc drive shown in FIGS. 1 and 2.

When configured with servo burst sectors 314, each disc track 306 is divided into slices called data wedges 316. The burst sectors 314 include data for maintaining accurate positioning of the disc head 118 and are positioned in predetermined locations along the disc 108. As the disc 108 rotates, the data head 118 reads the servo information containing an address within the servo bursts 314 and sends the servo information back to the servo control system 150 (FIG. 4). The servo control system 150 checks whether the address in the servo information read from the burst sectors 314 corresponds to the desired head location. If the address does not correspond to the desired head location, the actuator arm 114 is adjusted until the head 118 is moved to the correct track location.

Each track 306 includes discrete data sectors 322 containing stored user information. The number of data sectors 322 contained in a particular track 306 depends, in part, on the length (i.e. circumference) of the track 306. Therefore, tracks 306 located at the outer zone 312 typically contain more data sectors 322 per data wedge 316 than tracks 306 located at the center zone 311. Similarly, tracks 306 located at the center zone 311 typically contain more data sectors 322 per data wedge 316 than tracks 306 located at the inner zone 308. Besides containing user information, each data sector 322 also may include other data to help identify and process the user information. Tracks 306 may also contain one or more permanently defective sectors 322 that cannot be reliably written to or read from by the disc drive 100 circuitry. For this reason, a number of alternate sectors are provided in one or more alternate tracks 320 to which data that is intended to be written in these defective sectors can be revectored.

In accordance with a first embodiment shown in FIG. 1, the disc 108 may include one or more landing zones 120 for parking the read/write head 118 while the drive 100 is de-energized. As such, the head 118 is prevented from inadvertently contacting the surface of the disc 108 while the disc 108 is stationary. The use of a landing zone 120 to disengage a head 118 from data regions 304 on the surface of the disc 108 is commonly found in disc drives 100 administering a contact start/stop technique. With respect to the contact start/stop technique, the servo control system 150 controls the actuator 114 such that the slider contacts the landing zone 120 during start and stop operations when there is insufficient rotational speed to maintain the air bearing between the surface of the disc 108 and the slider. The landing zone 120 may be a dedicated radial region on the disc 108 that is specially textured to minimize the effect of stiction, which is static friction between a very smooth disc surface and a slider on a read/write head 118.

In accordance with a second embodiment shown in FIG. 2, the disc 108 may include a load/unload ramp 121 for parking the read/write heads 118 off the surface of the disc 108 while drive 100 is de-energized. A load/unload ramp 121 prevents the read/write head 118 from inadvertently contacting the surface of the disc 108 while the disc 108 is rotating at a speed insufficient for maintaining the air bearing between the surface of the disc 108 and the slider. In a disc drive 100 utilizing a load/unload ramp 121, the read/write head 118 is mechanically unloaded from the disc 108 by the servo control system 150 at power-down. The head 118 is then loaded back to the disc 108 when the disc 108 has reached a rotational speed sufficient to generate the air bearing.

Referring now to FIG. 4, shown therein is a functional block diagram of the disc drive 100 shown in FIGS. 1 and 2 generally showing the main functional components which are resident on the disc drive printed circuit board and used to control the operation of the disc drive 100. The disc drive 100 is shown in FIG. 4 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM), and other sources of resident memory for the microprocessor 142. The discs 108 are rotated on a spindle hub 106 at a constant high speed by a spindle motor 156 controlled by a spindle control module 148. The spindle control module 148 is a component of an application specific integrated circuit (ASIC) 152 receiving instructions related to rotational velocity from the microprocessor 142. The microprocessor 142 sets the rotational speed of the spindle hub 106, and thus the discs 108 attached thereto, by communicating with the spindle control module 148. Accordingly, the spindle control module 148 receives instructions from the microprocessor 142 directing the control module 148 to set the rotational speed of the discs 108.

Figure 5:
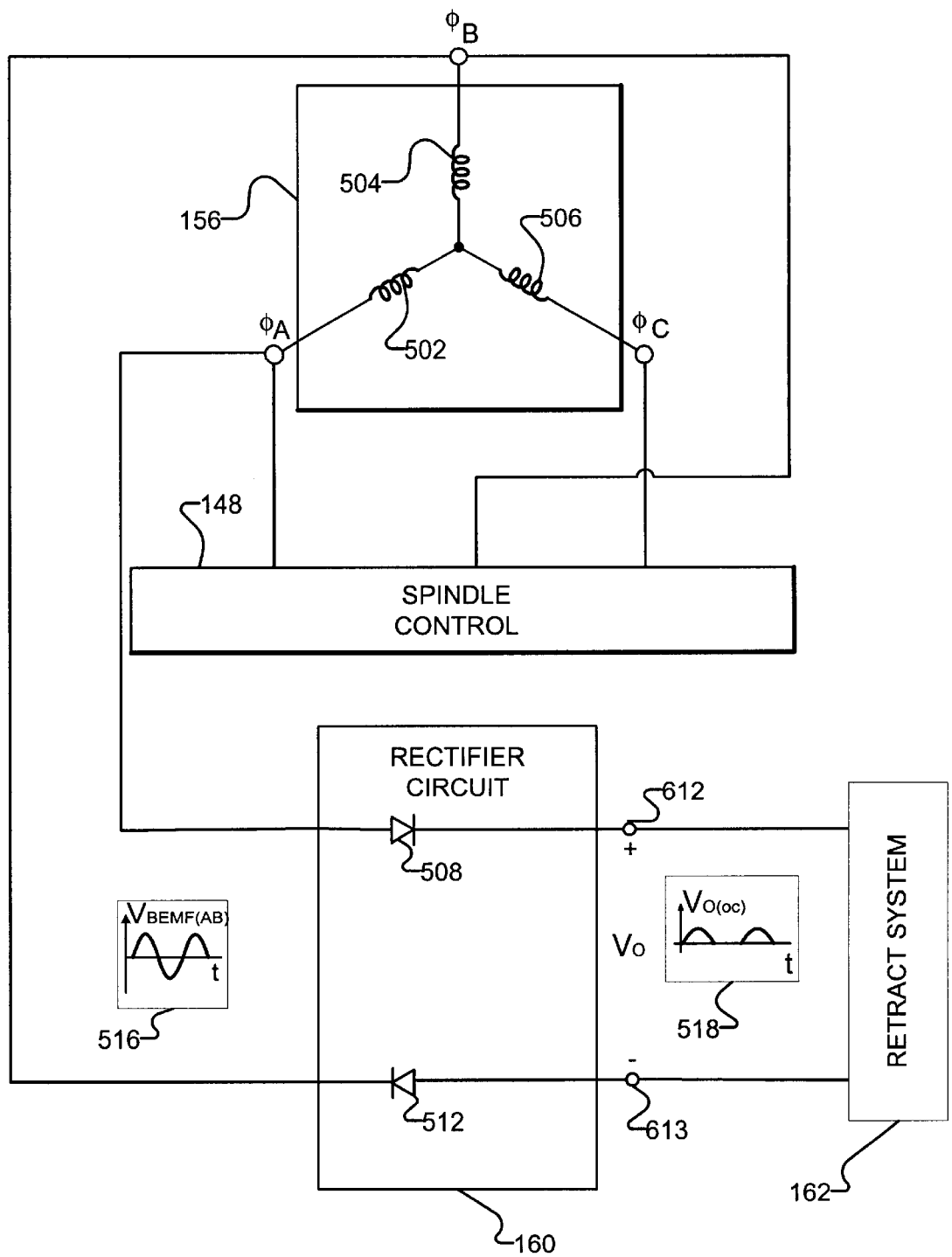
FIG. 5 is a schematic diagram generally showing a spindle motor and a rectifier in accordance with an embodiment of the present invention.

Although the spindle control module 148 may be implemented as any type of hardware, i.e. a digital or analog circuit, or software, such as a machine or computer based programming language, for illustration purposes and not by means of limitation, the spindle control module 148 is described hereafter as an analog circuit. As such, once the spindle control module 148 is instructed of a desired rotational speed of the discs 108 via communication with the microprocessor 142, the spindle control module 148 supplies current to windings 502, 504 and 506 (FIG. 5) of the spindle motor 156. Current supplied to the windings 502, 504 and 506 may be generated from a power supply, such as a battery source, and regulated by the spindle control module 148 such that the magnitude of the current dictates the rotational speed of the discs 108 attached to the spindle hub 106. Referring to FIG. 5, the spindle motor 156 may be a "Y" type brushless, three-phase spindle motor 156 having fixed windings 502, 504 and 506 as field coils in accordance with one embodiment of the present invention. As such, the spindle control module 148 serves as a power supply to the spindle motor 156.

Referring back to FIG. 4, the radial position of the heads 118 over the rotating discs 108 is controlled through the application of current to a coil 126 of the VCM 124. A servo control system 150 provides such control. Like the spindle control module 148, the servo control system 150 may be a component of the ASIC 152 and thus receives instructions from the microprocessor 142. In executing a read or write command, the microprocessor 142 receives servo information identifying the position of the read/write head 118 on the disc 108. Based on this servo information, the microprocessor 142 instructs the servo control system 150 of the displacement needed in order for the head 118 to seek from an origination track 306 associated with the current head position to a destination track 306. The servo control system 150 then supplies a current to the coil 126 of the VCM 124 based on the instruction from the microprocessor 142. The controlled application of current to the coil 126 causes magnetic interaction between the permanent magnets 128 (FIG. 1) and the coil 126 so that the coil 126 moves in accordance with the well-known Lorentz relationship. As the coil 126 moves, the actuator arms 114 about the bearing shaft assembly 112 and the heads 118 are caused to move across the surfaces of the discs 108 rotating about the spindle hub 106.

Data are transferred between the host computer 140 and the disc drive 100 by way of a disc drive interface 144, which includes a buffer 145 to facilitate high speed data transfer between the host computer 140 and the disc drive 100. Data to be written to the discs 108 are thus passed from the host computer 140 to the buffer 145 and then to a read/write channel 146, which encodes and serializes the data prior to the data being provided to a preamplifier (not shown). The preamplifier then provides the requisite write current signals to the heads 118. To retrieve data that has been previously stored by the disc drive 100, read signals are generated by the heads 118 and provided to the preamplifier, which then provides the read signals to the read/write channel 146. The interface 144 performs read signal decoding, error detection, and error correction operations. The interface 144 then outputs the retrieved data to the buffer 145 for subsequent transfer to the host computer 140. Such operations of the disc drive 100 are well known in the art and are discussed, for example, in U.S. Pat. No. 5,276,662 issued Jan. 4, 1994, to Shaver et al.

In accordance with an embodiment, at disc drive power-down the microprocessor 142 transmits a signal to the spindle control module 148 instructing the module 148 to discontinue the application of current to the windings, 502, 504 and 506 of the spindle motor 156. Disc drive power-down may be used to identify not only power shut off to the disc drive, but also situations where power is shut off to a spindle motor supplying power to a spindle hub rotating the discs during normal disc drive operation. The spindle control module 148 may include circuitry, such as relays, solid-state switches, such as a field effect transistor (FET), or other switching device to open-circuit the output lines of the spindle control module 148 to the spindle motor 156 thereby disconnecting the spindle control module 148 from the spindle motor 156. The spindle hub 106, and thus the discs 108 rotating around the spindle hub 106, immediately begin to lose velocity as the discs 108 continue spinning due to rotational inertia in the discs 108. This rotational inertia is then transformed into electrical energy as a back electromotive force ($V_{BEMF}$) is generated across windings 502, 504 and 506 of the spindle motor 156. The back electromotive force across the windings 502, 504 and 506 generates alternating currents that may be used to produce an electric field in a VCM 124 operably connected to the actuator arms 114 of the actuator assembly 110. As described in greater detail below, by decoupling the spindle control module 148 from an energized spindle motor 156 and then coupling the windings, 502, 504 and 506 of the spindle motor 156 to the VCM 124, the alternating currents generated in the windings 502, 504 and 506 as the discs 108 attached to the spindle hub 106 spin down, i.e., decrease in rotational velocity, may be captured and applied to the coil 126 of the VCM 124 to move the actuator assembly 110. As such, when power is removed from the spindle motor 156, the kinetic energy of the rotating discs 108 may be used as a supplemental source of electrical power to the VCM 124.

In accordance with an embodiment of the present invention, the ASIC 152 also includes a half-wave rectifier 160 that connects to the windings, 502, 504 and 506 of the spindle motor 156 at power-down and rectifies the alternating currents generated from the rotational inertia of the discs 108. As described in more detail below, the rectifier 160 is designed such that the current waveform output by the rectifier 160 inherently contains time periods wherein the magnitude of the current is zero amperes. The ASIC 152 may include circuitry, such as relays, solid state switches, such as a field effect transistor (FET), or other switching device that closes a connection between the rectifier 160 and the spindle motor 156 during power-down, but opens the connection while the spindle motor 156 is energized by the spindle control module 148.

Referring to FIG. 5, the rectifier 160 is shown as a circuit having a first diode 508 and a second diode 512. The first diode 508 is coupled to a first phase ($\Phi A$) of the spindle motor 156 and the second diode is coupled to a second phase ($\Phi B$) of the spindle motor 156. The rectifier 160 rectifies the currents generated by the spindle motor 156 to produce an output current signal at the output of the rectifier 160. The output current is preferably provided to the retract system 162 at an upper retract system node 612. An output voltage ($V_o$) may be measured between the first diode 508 and the second diode 512. Although the rectifier 160 is shown in FIG. 5 having only two diodes 508 and 512 in accordance with a preferred embodiment of the present invention, it should be appreciated that the rectifier circuit 160 may include a single diode or more than 2 diodes, so long as the diodes are configured such that the output current comprises one or more non-zero magnitude phases, with each non-zero magnitude phase being followed by a zero magnitude phase.

Alternating currents generated by the rotational inertia are thus rectified and the resulting output of the rectifier 160 is the output current. In accordance with an embodiment, the output current may contain a period of 50% of the cycle-time during which the magnitude of the current is zero. By providing an open circuit between the rectifier 160 and the retract system 162, this zero magnitude time period, or phase, may be illustrated by an open circuit voltage signal ($V_{o(oc)}$) 518, which is the output voltage potential, $V_o$, measured across a hypothetical open circuit between the upper retract system node 612 and a lower retract system node 613. As the open-circuit voltage signal ($V_{o(oc)}$) 518 reaches a magnitude of zero volts, the output current reaches a magnitude of zero amperes. As such, the output current will remain forced to zero until the magnitude of the open-circuit voltage signal ($V_{o(oc)}$) 518 returns to a non-zero magnitude. By designing the rectifier 160 with two diodes 508 and 512, current is supplied from only two of the three phases generated in the spindle motor 156 thereby forcing the output current to zero at times when the net voltage between both phases supplied to the rectifier 160 is zero.

A back EMF voltage ($V_{BEMFP}$) potential may be measured between the two phases of $V_{BEMF}$ supplied to the rectifier 160. To illustrate FIG. 5, and not by means of limitation, the back EMF voltage potential ($V_{BEMFP}$) may be taken between phase A ($\Phi A$) and phase B ($\Phi B$) of $V_{BEMF}$. It should be appreciated that the back EMF voltage potential ($V_{BEMFP}$) may be taken between either of the two phases, i.e., phase A ($\Phi A$)/phase B ($\Phi B$), phase A ($\Phi A$)/phase C ($\Phi C$) or phase C ($\Phi C$)/phase B ($\Phi B$), depending upon which currents are supplied to the rectifier 160. Furthermore, if the rectifier 160 only includes a single diode 508, then the measured back EMF voltage potential ($V_{BEMFP}$) is taken across that $V_{BEMF}$ phase and ground. The relationship between the back EMF voltage potential ($V_{BEMFF}$) taken between phase A ($\Phi A$) and phase B ($\Phi B$) and the open-circuit output voltage ($V_{o(oc)}$) resulting at the output of the rectifier 160 is illustrated in FIG. 5. As such, the back EMF voltage potential signal ($V_{BEMFP}$) 516 input to the rectifier 160 is an exemplary representation of a back EMF signal and the open-circuit output voltage signal ($V_{o(oc)}$) 518 is an exemplary representation of the open-circuit voltage taken across the upper retract system node 612 and the lower retract system node 613.

Referring back to FIG. 4, the servo control system 150 may include circuitry, such as relays, solid state switches, such as a field effect transistor (FET), or other switching device to disconnect some or all components of the control system 150 from the VCM 124 at disc drive power-down. Indeed, at power loss, the servo control system 150 is effectively disconnected from the VCM 124 thereby unable to move the actuator arms 114 to direct the read/write heads 118 to a location either away from the data zones 304 of the disc, i.e., a landing zone 120, or off the disc 108 entirely, i.e., a load/unload ramp 121. As such, in order to prevent the heads 118 from contacting the data zones 304 on the surface of the discs 108 as the rotational velocity of the discs 118 decrease, power from the output of the rectifier 160 is supplied to a retract system 162, which, at disc drive power-down, is coupled across the coil 126 of the VCM 124 as the connection between the servo control system 150 and the VCM 124 is preferably open-circuited. Thus, the retract system 162 may include circuitry, such as relays, solid state switches, such as a field effect transistor (FET), or other switching device that closes a connection between the retract system 162 and the VCM 124 during power-down, but opens the connection while the VCM 124 is energized by the servo control system 150.

When powered by the output of the rectifier 160, the retract system 162 moves the actuator arms 114 about a desired retract velocity and in a direction such that the read/write heads 118 are moved to either a landing zone 120 or a load/unload ramp 121. The desired retract velocity may be defined not only as a finite retract velocity of the read/write heads 118 retracting across the discs 108, but also as a selected velocity range to which the retract velocity is maintained between upper and lower limits of the selected velocity range. As such, in accordance with one embodiment, the read/write heads 118 are moved to non-data locations at a retract velocity that is between upper and lower limits of the desired retract velocity range. The retract system 162 applies a current to the coil 126 of the VCM 124 thereby inducing the actuator assembly 110, and thus the actuator arms 114, to move in an orientation defined by the direction of current flow through the coil 126. As such, the read/write heads 118 are preferably moved away from the data regions 304 of the discs 108 and toward either a load/unload ramp 121 or a landing zone 120 at a relatively constant velocity.

The controlled application of current to the coil 126 in order to maintain a relatively constant velocity of movement by the actuator arms 114, and thus the read/write heads 118, is described in more detail with reference to FIGS. 6 and 7. A constant velocity may be defined not only as a finite retract velocity of the read/write heads 118 retracting across the discs 108, but also as a selected velocity range to which the retract velocity is maintained between upper and lower limits of the selected velocity range. For instance, the velocity may be referred to as constant if the retract velocity is maintained at 10 inches per second (IPS) as the heads 118 are moved across the discs 108. Likewise, the velocity may also be referred to as constant if the retract velocity is maintained between 9 IPS and 11 IPS as the heads 118 are moved across the discs 108.

Figure 6:
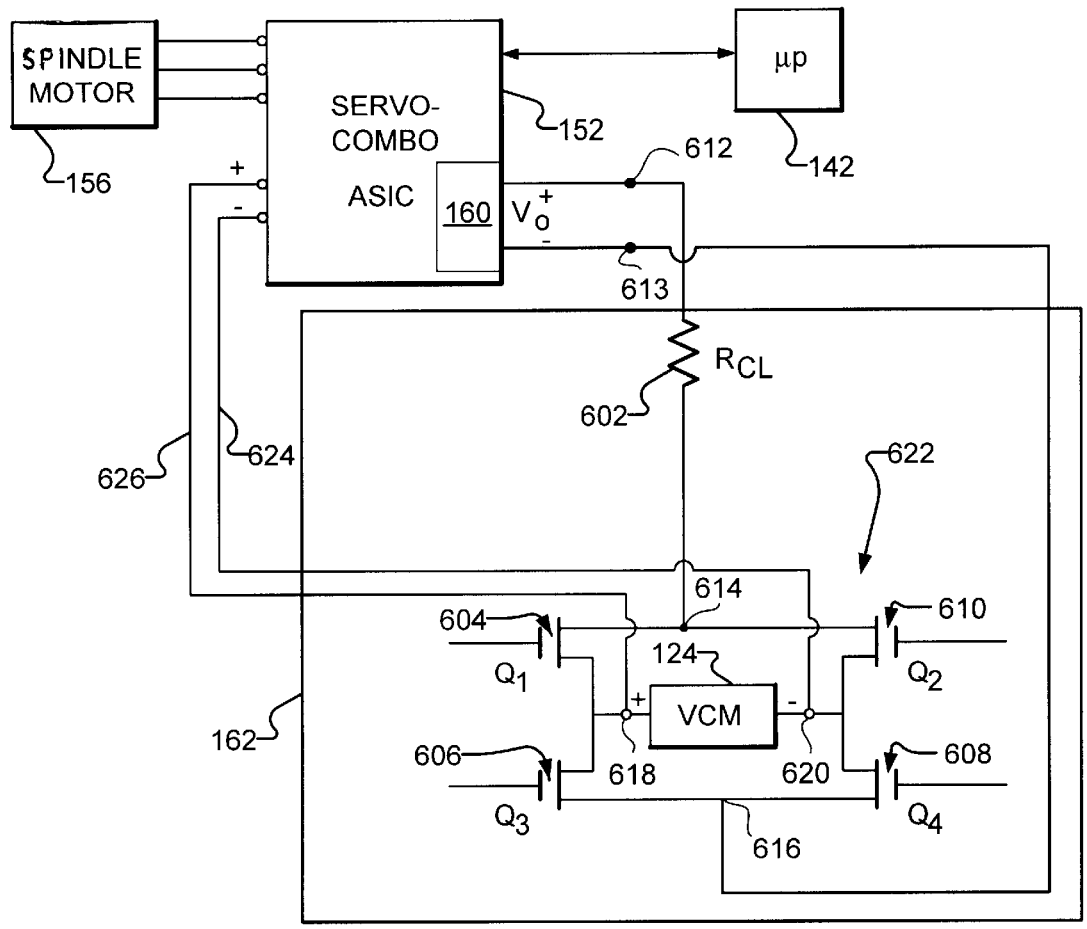
FIG. 6 is a schematic diagram showing a retract system in accordance with an embodiment of the present invention.

Referring to FIG. 6, a retract system 162 is shown having a current-limiting impedance 602 and an H-bridge circuit 622 having a first switching device (Q1) 604, a second switching device (Q2) 610, a third switching device (Q3) 606 and a fourth switching device (Q4) 608. In accordance with an exemplary embodiment, and as hereafter described below, the current-limiting impedance 602 may be resistance of a resistor and the switching devices 604, 606, 608 and 610 may be field effect transistors (FET's). The retract system 162 is coupled to the rectifier 160 at the upper retract system node 612 and the lower retract system node 613 in accordance with an embodiment of the invention.

As described above, back EMF ($V_{BEMF}$) generated by the spindle motor 156 is applied across input terminals of the rectifier 160. Specifically, a back EMF voltage potential ($V_{BEMFP}$) between either two of the three phases of back EMF ($V_{BEMF}$) may be applied across the rectifier input terminals in accordance with an embodiment of the invention. The rectifier 160 rectifies alternating currents generated by the two phases of the back EMF ($V_{BEMF}$) across which $V_{BEMFP}$ is measured to generate an output current at the output of the rectifier 160 and an output voltage potential $V_o$ between the first diode 508 and the second diode 512. The output current may be a current signal having a period of 50% of the cycle-time during which current is zero amperes. The output voltage, $V_o$, may be applied across the retract system 162 such that the output current enters the retract system via the upper retract system node 612. $V_0$ is a voltage potential resulting between the upper retract system node 612 and the lower retract system node 613 at the output of the rectifier 160. As the output current is supplied from the rectifier circuit 160 to the retract system 162, the output current and the output voltage $V_0$ are directly proportional in magnitude. However, at times when the output current has a magnitude of zero amperes, the output voltage is forced to the voltage realized across the VCM 124. As such, $V_o$ is shown and described in FIGS. 5, 6, 8, 9, 10 and 11 as an open circuit voltage signal ($V_{o(oc)}$) having a period of 50% of the cycle-time during which $V_{o(oc)}$ has a zero magnitude phase. Thus, at times when the magnitude of $V_{o(oc)}$ is zero volts, the magnitude of the output current to the retract system 162 equals zero amperes.

Because the current between the upper retract system node 612 and an upper H-bridge node 614 controls acceleration and deceleration of the actuator arms 114, and thus the magnitude of velocity of the read/write heads 118 as the heads 118 are positionally displaced across the surface of the discs 108 to either a landing zone 120 or a load/unload ramp 121, this output current is hereinafter referred to as a "control current." As the control current is applied to the coil 126 of the VCM 124, the VCM 124, which, as described above is surrounded by a magnetic field, moves in accordance with the well-known Lorentz relationship thereby accelerating the rate at which the actuator arms 114, and thus the heads 118, are moved across the discs 108.

The radial direction of displacement of the read/write heads 118, i.e., toward the OD 138 or the ID 136, is dependent upon the direction of current through the coil 126 of the VCM 124. The direction of current through the coil 126 is dependent upon which two FET's are on, thereby closing the circuit between an upper H-bridge node 614 and a lower H-bridge node 616. As such, if Q1 604 and Q4 608 are on, current enters the coil 126 at the positive terminal 618 of the coil 126 and exits at the negative terminal 620. In contrast, if Q2 610 and Q3 606 are on, current enters the coil 126 at the negative terminal 620 of the coil 126 and exits at the positive terminal 618. Initially, the determination of the direction of current flow is based on whether, at disc drive power-down, the read/write heads 118 are to radially move toward the OD 138 or the ID 136. Accordingly, such a determination may be made during disc drive development. For example, and not by means of limitation, if a disc drive 100 is of a load/unload ramp configuration, then, at power-down, the read/write heads 118 of the disc drive 100 would most likely require movement toward the OD 138 of the discs 108. As such, disc drive developers may design the retract system 162 such that a current entering the positive terminal 618 of the coil 126 results in movement of the heads 118 toward the OD 138. Thus, at disc drive power-down, FET's Q1 604 and Q4 608 would be on, thereby closing the retract system 162 such that the control current enters the coil 126 at the positive terminal 618 and exits at the negative terminal 620.

For simplicity, the disc drive 100 is described below as employing a load/unload ramp 121 to remove and maintain the read/write heads 118 from the data regions 304 on the surface of the discs 108. As such, the read/write heads 118 are displaced in a radial direction toward the OD 138 of the discs 108. In maintaining the retract velocity of the read/write heads 118 across the discs 108 about, i.e., between upper and lower limits of, a desired retract velocity, a control system may be used to select which FET's are on as the control current enters the upper H-bridge node 614 and exits the lower H-bridge node 616. Such a control system 700 is shown in FIG. 7 in accordance with an embodiment of the present invention. Like the servo control system 150, the spindle control module 148 and the rectifier 160, the control system 700 may be coupled to the ASIC 152 thereby operable to receive instructions from the microprocessor 142.

Figure 7:
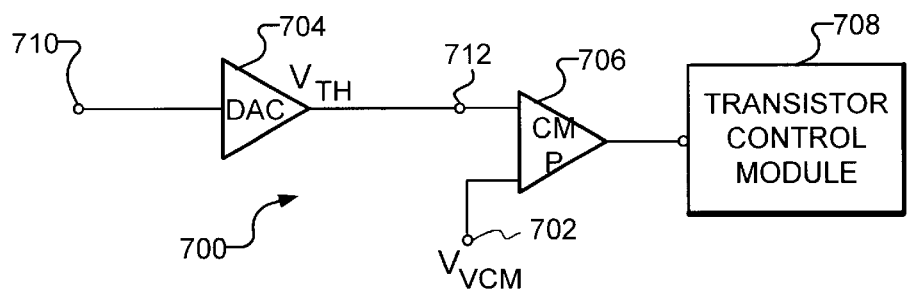
FIG. 7 is a schematic diagram showing a velocity control system in accordance with an embodiment of the present invention.

Referring to FIG. 7, a control system 700 for maintaining the retract velocity of the read/write heads 118 about a desired retract velocity is shown in accordance with an embodiment of the invention. The control system 700 includes a comparison device 706, which in an exemplary embodiment may be a comparator, a digital-to-analog converter (DAC) 704 and an H-bridge control module 708. An input 710 to the DAC 704 may be coupled to a register set to an instructed bit count. The instructed bit count corresponds to a desired retract velocity for moving the read/write heads 118 to the OD 138. Alternatively, the input 710 to the DAC 704 may receive communications directly from the microprocessor 142, the directions containing an instructed bit count corresponding to the desired retract velocity. The DAC 704 converts the instructed bit count to an analog voltage signal (VTH).

During a time that the magnitude of the open circuit output voltage $V_{o(oc)}$ is zero, the magnitude of the control current through the current-limiting resistor ($R_{CL}$) 602 is also zero. At this time, the voltage across the coil 126 ($V_{VCM}$) of the VCM 124 is sampled and held for presentation to the comparator 706 via input 702. $V_{VCM}$ corresponds to the actual retract velocity of the actuator arms 114, and thus the read/write heads 118, across the surface of the discs 108 to the OD 138. As such, $V_{VCM}$ can be defined by the following equation:

$$V_{VCM} = K_e * w + IR \quad \text{[Equation 1]}$$

In Equation 1, $K_e$ is a constant, w is the rotational velocity of the actuator arm 114 in radians/sec, I is the control current and R is the resistance of the VCM 124. Because the control current is zero, $V_{VCM}$ represents the actual retract velocity of the actuator arms 114. In accordance with an embodiment, the control system 700 may be a component of the ASIC 152 thereby receiving communications, such as the instructed bit count, from the microprocessor 142. Such a configuration is shown in FIG. 6 with the positive terminal 618 and negative terminal 620 of the coil 126 being shown connected, through lead wires 626, 624, respectively, to the ASIC 152. The lead wires 626, 624 may be used to sample $V_{VCM}$ and thus may constitute a data acquisition device. In accordance with other embodiments, the control system 700 may be a stand-alone device or component or any type of analog or digital control system used to control the retract velocity of the read/write heads 108.

The comparator 706 compares $V_{VCM}$ and $V_{TH}$ as the two voltages are presented to the comparator 706 via inputs 702 and 712, respectively. The comparator output is presented to an H-bridge control module 708 that controls the orientation or direction of current between the upper H-bridge node 614 and the lower H-bridge node 616, thereby dictating whether rate of movement by the actuator arms 114 is accelerated or decelerated as the control current enters the H-bridge 622. If $V_{VCM}$ is less than $V_{TH}$, the H-bridge control module 708 interprets the comparison as requiring acceleration by the actuator arms 114. In contrast, if $V_{VCM}$ is greater than $V_{TH}$, the H-bridge control module 708 interprets the comparison as requiring deceleration by the actuator arms 114. As such, the H-bridge control module 708 determines the state, i.e., on or off, of the FET's 604, 606, 608 and 610 based on the comparison made by the comparator 706. As an example, and not by means of limitation, as current flows through the H-bridge circuit 622 from the upper H-bridge node 614 to the lower H-bridge node 616, if the current enters the coil 126 of the VCM 124 at the positive terminal 618, then the actuator arms 114 accelerate, thus, resulting in an increase in velocity of the heads 118 moving across the discs 108. For current to enter the coil 126 at the positive terminal 618, the Q1 FET 604 and the Q4 FET 608 should be on and the Q2 FET 610 and the Q3 FET 606 should be off. In contrast, as current flows through the H-bridge circuit 622 from the upper H-bridge node 614 to the lower H-bridge node 616, if the current enters the coil 126 of the VCM 124 at the negative terminal 620, then the actuator arms 114 decelerate, thus, resulting in a decrease in velocity of the heads 118 moving across the discs 108. For current to enter the coil 126 at the negative terminal 620, the Q2 FET 610 and the Q3 FET 606 should be on and the Q1 FET 604 and the Q4 FET 608 should be off. Table 1, below, illustrates this example:

TABLE 1

|  | Q1 | Q2 | Q3 | Q4 |
| --- | --- | --- | --- | --- |
| Acceleration | ON | OFF | OFF | ON |
| Deceleration | OFF | ON | ON | OFF |

In accordance with an embodiment, the present invention may be implemented as a computer-readable program storage device which tangibly embodies a program of instructions executable by a computer system to positionally displace read/write heads of an actuator assembly at a constant velocity. As such, the logical operations of the various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 8:
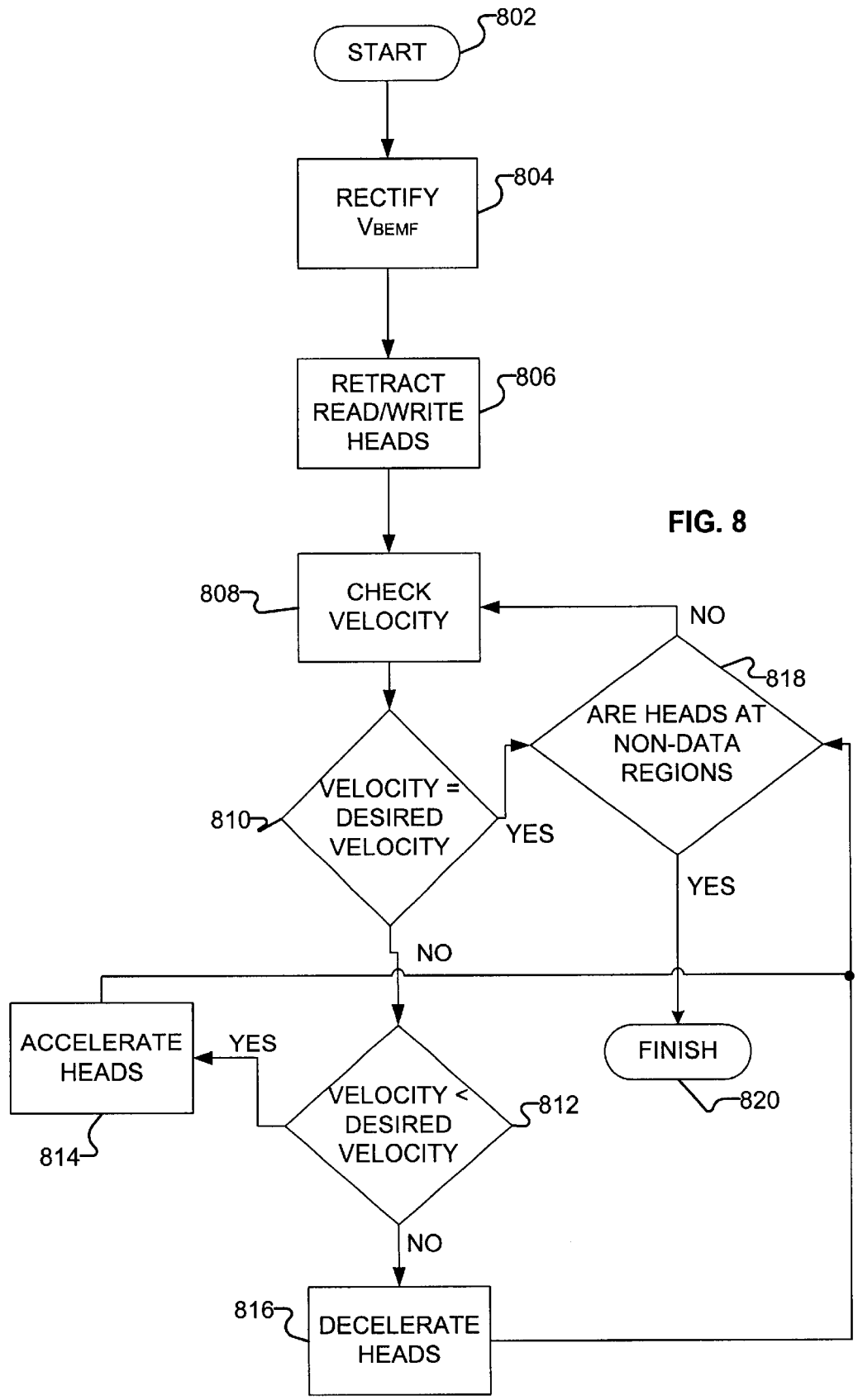
FIG. 8 is a flow diagram that illustrates operational characteristics for retracting an actuator assembly in accordance with an embodiment of the present invention.

FIG. 8 illustrates operations associated with an actuator assembly retract procedure 800 in accordance with an embodiment of the present invention. The actuator assembly retract procedure 800 may be employed to move read/write heads 118 of an actuator assembly 110 away from data regions 304 on the surface of the discs 108 and toward non-data locations, i.e., 120 and 121, either located on or in close proximity to the discs 108. In accordance with a first embodiment of the present invention depicted in FIG. 1, the actuator assembly retract procedure 800 retracts actuator arms 114 of an actuator assembly 110 such that the attached read/write heads 118 may be retracted toward a landing zone 120 located in close proximity to the ID 136 of the discs 108. The heads 118 may also be retracted toward a landing zone 120 located in close proximity to the OD 138 of the discs 108. In accordance with a second embodiment of the present invention depicted in FIG. 2, the read/write heads 118 may be retracted toward a load/unload ramp 121 in close proximity to the OD 138 of the discs 108. For purposes of illustration only, and not by means of limitation, the heads 118 are hereafter described as being retracted toward the OD 138 of the discs 108 by the actuator assembly retract procedure 800.

The actuator assembly retract procedure 800 comprises an operation flow beginning with start operation 802 and concluding with termination operation 820. Specifically, the actuator assembly retract procedure 800 is preferably initiated at start operation 802 at disc drive power-down. Operation flow passes from start operation 802 to rectify operation 804. Rectify operation 804 rectifies alternating currents generated as a result of a rotational inertia in the rotating discs 108 as the spindle hub 106, and thus the discs 108 rotating about the spindle hub 106, decrease in rotational velocity. Once the alternating currents are rectified, operation flow passes to retract operation 806. Retract operation 806 initiates retraction of the read/write heads 118 from data regions 304 on the surfaces of the discs 108 toward the non-data locations on or in close proximity to the discs 108 by inducing a current in the coil 126 of the VCM 124, thereby causing the actuator assembly 110 to move in accordance with the well-known Lorentz relationship. In accordance with an embodiment of the present invention, the rectified alternating currents generate an output voltage potential ($V_o$) and supply a control current to the coil 126 of the VCM 124 to administer retraction of the read/write heads 118. The control current preferably contains a period of 50% of the cycle-time during which the magnitude of the output current is zero. Likewise, the output voltage potential ($V_o$) measured as an open circuit voltage ($V_{o(oc)}$) between the upper retract system node 612 and the lower retract system node 613 contains a period of 50% of the cycle-time during which the magnitude of $V_{o(oc)}$ is zero.

As the actuator arms 114 are being retracted toward the OD 138, operation flow passes from retract operation 806 to velocity detect operation 808. Velocity detect operation 808 detects the velocity at which the actuator arms 114, and thus the read/write heads 118, are being retracted toward the OD 138. Once this velocity is detected, operation flow passes to query operation 810. Query operation 810 compares the velocity detected by velocity detect operation 808 to a desired retract velocity. If query operation 810 determines that the detected velocity equals the desired retract velocity, operation flow passes to query operation 818. In accordance with a preferred embodiment, velocity detect operation 808 detects the retract velocity by measuring the back EMF across the VCM ($V_{VCM}$) at time periods when the magnitude of $V_{o(oc)}$ is zero volts, and thus the output current supplied by rectify operation 804 has a magnitude of zero amperes. Such an embodiment is described in greater detail with FIG. 11.

Query operation 818 determines whether the read/write heads 118 have reached the non-data locations, i.e., 120 and 121, that the heads 118 are being retracted to. As such, if the heads 118 have been retracted to these locations, operation flow concludes at termination operation 820. If, however, the heads 118 have not yet been retracted to these locations, operation flow passes to velocity detect operation 808 and continues as described above and below.

In accordance with one embodiment of the present invention, the heads 118 may be judged to have safely reached the non-data locations at a time dependent upon a back EMF voltage potential ($V_{BEMFP}$) resulting in a predefined magnitude. The back EMF voltage potential ($V_{BEMFP}$) is a voltage potential measured between two phases of the back EMF ($V_{BEMF}$) generated in the spindle motor 156 as the discs 108 attached to the spindle hub 106 continue to spin at disc drive power down. The desired retract velocity may be set to a velocity that displaces the read/write heads 118 from data locations on the discs 108 to the non-data locations in the time that it takes $V_{BEMFP}$ to reach the predefined magnitude. In accordance with an embodiment illustrated in FIG. 5, $V_{BEMFP}$ may be measured between phase A (ΦA) and phase B (ΦB) of $V_{BEMF}$. As such, $V_{BEMFP}$ may be referred to as $V_{BEMF(AB)}$, as shown in FIG. 5. For example, and not by means of limitation, the heads 118 may reach the non-data locations at the time that the magnitude $V_{BEMF(AB)}$ reaches zero volts. Thus, query operation 818 may determine whether $V_{BEMF(AB)}$ has reached a magnitude of zero. The magnitude of $V_{BEMF(AB)}$ reaches zero when kinetic energy is no longer generated by a rotation of the discs 108 about the spindle hub 106. As such, the magnitude of $V_{BEMF(AB)}$ reaches zero when the discs 108 complete spinning. If the magnitude of $V_{BEMF(AB)}$ is zero, operation flow concludes at termination operation 820. If, however, query operation 818 determines that the magnitude of $V_{BEMF(AB)}$ has not reached zero, operation flow passes to velocity detect operation 808 and continues as described above and below.

In accordance with a second embodiment, query operation 818 may determine that the read/write heads 118 are located at the data regions 304 by the velocity detected by velocity detect operation 808. The fact that the detected velocity has reached zero may be an indication that the read/write heads 118 have reached the non-data locations. As such, if query operation 818 determines that the detected velocity has reached zero, operation flow concludes at terminate operation 820. If, however, query operation 818 determines that the detected retract velocity has not reached zero, operation flow passes to velocity detect operation 808 and continues as described above and below.

If query operation 810 determines that the detected velocity is not equal to the desired retract velocity, operation flow passes to query operation 812. Query operation 812 determines whether the detected velocity is less than the desired retract velocity. If the detected velocity is less than the desired retract velocity, operation flow passes to accelerate operation 814. Accelerate operation 814 accelerates the rate at which the actuator arms 114 are retracted thereby increasing the retract velocity of the read/write heads 118 toward the OD 138. If the detected velocity is not less than the desired retract velocity, operation flow passes to decelerate operation 816. Decelerate operation 816 decelerates the rate at which the actuator arms 114 are retracted thereby decreasing the retract velocity of the read/write heads 118 toward the OD 138. As such, query operation 812, acceleration operation 814 and deceleration operation 816 operate to maintain a constant retract velocity of the read/write heads 118 across the surface of the discs 108 as the heads 118 are retracted toward the OD 138. Following acceleration and deceleration operations (814 and 816) operation flow passes to query operation 818 and continues as previously discussed. In accordance with an embodiment of the present invention, once the actuator assembly retract procedure 800 is concluded at termination operation 820, the read/write heads 118 will be located on non-data locations, located on or in close proximity to the discs 108, such as a landing zone 120 or a load/unload ramp 121.

Figure 9:
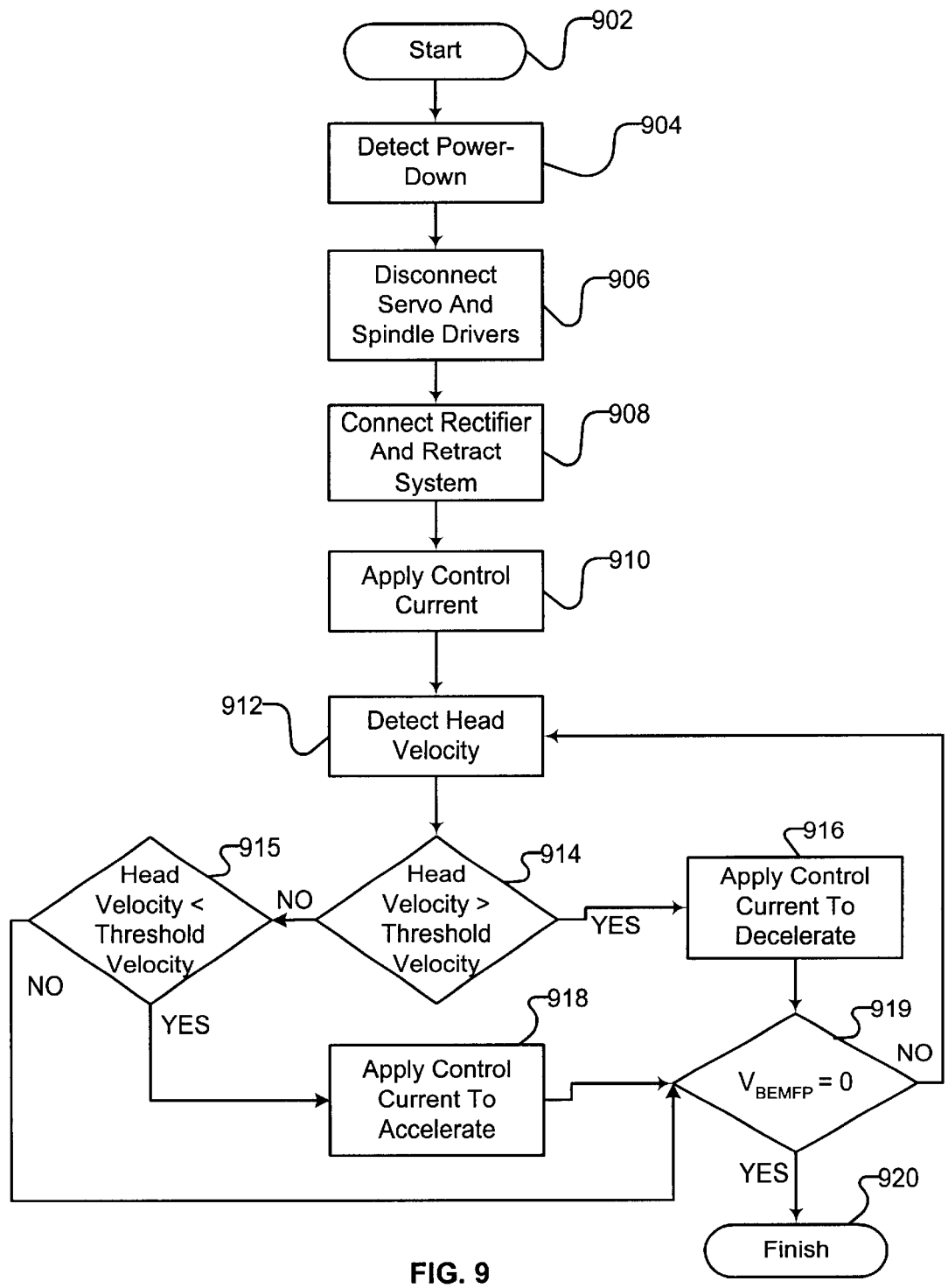
FIG. 9 is a flow diagram that illustrates operational characteristics shown in FIG. 8 in more detail in accordance with an embodiment of the present invention.

FIG. 9 illustrates operations associated with an actuator assembly retract procedure 900 as power is removed from a disc drive 100 in accordance with an embodiment of the present invention. The actuator assembly retract procedure 900 comprises an operation flow beginning with start operation 902 and concluding with termination operation 920. Following start operation 902, operation flow passes to detect operation 904. Detect operation 904 detects disc drive power down. In accordance with an embodiment, detect operation 904 detects disc drive power-down via a retract pulse. The retract pulse may be transmitted by the microprocessor 142 to the spindle control module 148 and the servo control system 150. The retract signal instructs the spindle control module 148 to terminate rotation of the spindle hub 106, and thus the attached discs 118.

Following power down detection, operation flow passes to decoupling operation 906. Decoupling operation 906 effectively disconnects the spindle control module 148 from the spindle motor 156 thereby forming an open circuit between the spindle control module 148 and the spindle motor 156. The spindle control module 148 may include circuitry, such as relays, solid state devices, such as a field effect transistor (FET) or other switching device to open circuit the output lines of the spindle control module 148 to the spindle motor 156 thereby disconnecting the spindle control module 148 from the spindle motor 156 and nulling current flow to the coils 504, 502 and 506 of the spindle motor 156. By eliminating current flow to the coils 504, 502 and 506, power used to drive the spindle hub 106 is shut off thereby causing the spindle hub 106, and thus the discs 108 rotating around the spindle hub 106, to lose rotational velocity. From the time that power to the spindle motor 156 is shut off, the discs 108 continue to spin, albeit at a decreasing rate, thereby generating kinetic energy in the rotating discs 108, which may also be referred to as rotational inertia. This rotational inertia produces a back electromotive force ($V_{BEMF}$) produced across windings 502, 504 and 506 of the spindle motor 156. The back electromotive force across the windings 502, 504 and 506 generates alternating currents that may be used to generate an electric field in a VCM 124 operably connected to the actuator arms 114 of the actuator assembly 110.

Furthermore, decoupling operation 906 disconnects the servo control system 150 from the coil 126 of the VCM 124 thereby forming an open circuit between the VCM 124 and the servo control module 150. The servo control module 150 may include circuitry such as relays, solid-state switches, such as a field effect transistor (FET), or other switching device to open circuit the output lines of the servo control system 150 to the coil 126 thereby disconnecting the servo control system 150 from the VCM 124. Once the servo control system 150 and the spindle control module 148 are decoupled from the coil 126 and the spindle motor 156, respectively, operation flow passes to coupling operation 908.

Coupling operation 908 connects a rectifier 160 to the phase lines of the spindle motor 156 previously coupled to the spindle control module 148 thereby closing the circuit between the spindle motor 156 and the rectifier 160. Likewise, coupling operation 908 connects a retract system 162 across the terminals 618, 620 of the coil 126 previously coupled to the servo control system 150 thereby closing the circuit between the coil 126 and the retract system 162. As such, two of the three alternating currents generated in the windings 502, 504 and 506 of the spindle motor 156 as the discs 108 continue to spin down are rectified by the rectifier 160 to produce an output voltage ($V_o$) and a control current at the output of the rectifier 160. The output voltage ($V_o$) is applied across the retract system 162 such that the control current enters the retract system 162 at the upper retract system node 612. The control current then flows through the current limiting resistor 602 and enters an H-bridge circuit 622. As current enters the upper H-bridge node 614, operation flow passes from coupling operation 908 to retract operation 910.

Retract operation 910 applies the control current entering the H-bridge circuit 622 to the coil 126 of the VCM 124. As current enters the coil 126, an electric field is generated around the coil 126. The electric field interacts with the magnetic field surrounding the coil 126 thereby causing the actuator arms 114, and thus the read-write heads 118 attached thereto, to retract toward either the OD 138 or the ID 136 of the discs 108, depending on whether the non-data locations are located on or in close proximity to the OD 138 or the ID 136. In accordance with a first embodiment of the invention depicted in FIG. 1, the heads 118 may be retracted toward a landing zone 120 located on or in close proximity to the ID 136 of the discs 108. The heads 118 may also be retracted toward a landing-zone 120 located on or in close proximity to the OD 138 of the discs 108. In accordance with a second embodiment of the present invention depicted in FIG. 2, the read/write heads 118 may be retracted toward a load/unload ramp 121 in close proximity to the OD 138 of the discs 108. For purposes of illustration only, and not a means of limitation, the heads 118 are hereafter described as being retracted toward the OD 138 of the discs 108.

Once retract operation 910 has applied current to the coil 126, thereby initiating retraction of the heads 118, operation flow passes to velocity detect operation 912. Velocity detect operation 912 detects the velocity of the read/write heads 118 across the surface of the disc 108 as the heads 118 are being retracted toward the OD 138. In accordance with an embodiment of the present invention, the velocity may be measured in inches per second (IPS). Once head velocity is detected, operation flow passes to query operation 914. Query operation 914 compares the head velocity to a threshold velocity, which is associated with a desired retract velocity of the heads 118. Many factors may go into determination of the desired retract velocity, such as, without limitation, slope of load/unload ramps 121 onto which the heads 118 are parked, friction of the ramps 121, a distance between the OD 138 and the ID 136 of the discs 108, the length in time that it takes the discs 108 to completely spin down, friction associated with the laser texture of the landing zones 120 onto which the heads 118 may be parked, and static friction, or stiction, associated with contact between any portion of the disc surface and the heads 118, etc . . . The desired retract velocity may be defined not only as a finite velocity of the read/write heads 118 retracting across the discs 108, but also as a selected velocity range to which the retract velocity is desired to be maintained between limits of the range.

If the head velocity is greater than the threshold velocity, operation flow passes to deceleration operation 916. Deceleration operation 916 applies current to the coil 126 in a direction that decelerates the rate at which the actuator arms 114 are retracted toward the OD 138 thereby reducing the retract velocity of the read/write heads 118. If, however, query operation 914 determines that the head velocity is not greater than the threshold velocity, operation flow passes to query operation 915. Query operation 915 determines whether the head velocity is less than the threshold velocity. If the head velocity is less than the threshold velocity, operation flow passes to acceleration operation 918. Acceleration operation 918 applies current to the coil 126 in a direction that accelerates the rate at which the actuator arms 114 are retracted toward the OD 138 thereby increasing the retract velocity of the read/write heads 118. If, however, query operation 915 determines the head velocity is not less than the threshold velocity, the control current is not applied to the coil 126 and operation flow passes to query operation 919. Thus, the heads 118 are neither accelerated nor decelerated toward the OD 138.

Query operation 919 determines whether $V_{BEMFP}$ has reached a magnitude of zero. If $V_{BEMFP}$ equals zero, operation flow is terminated at termination operation 920. If, however, $V_{BEMFP}$ does not equal zero, operation flow passes to velocity detect operation 912 and continues as previously described.

Figure 10:
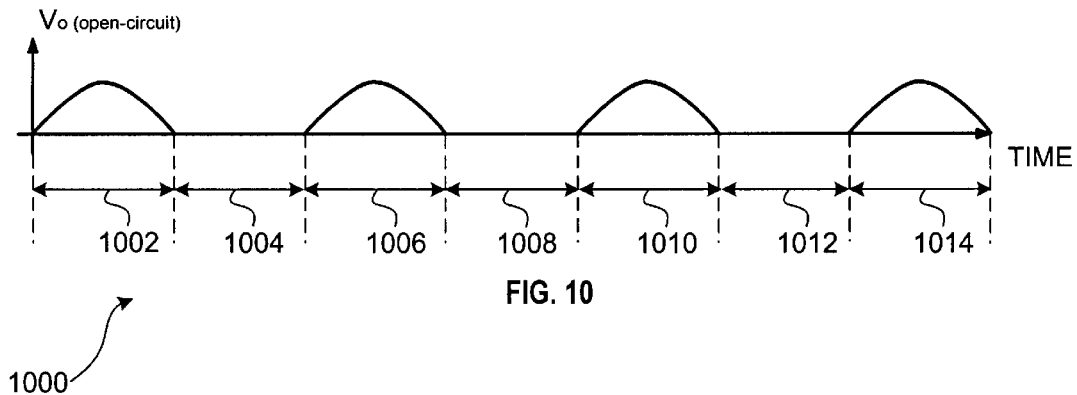
FIG. 10 is a timing diagram showing an open-circuit output voltage of the rectifier of FIG. 5 over time.
Figure 11:
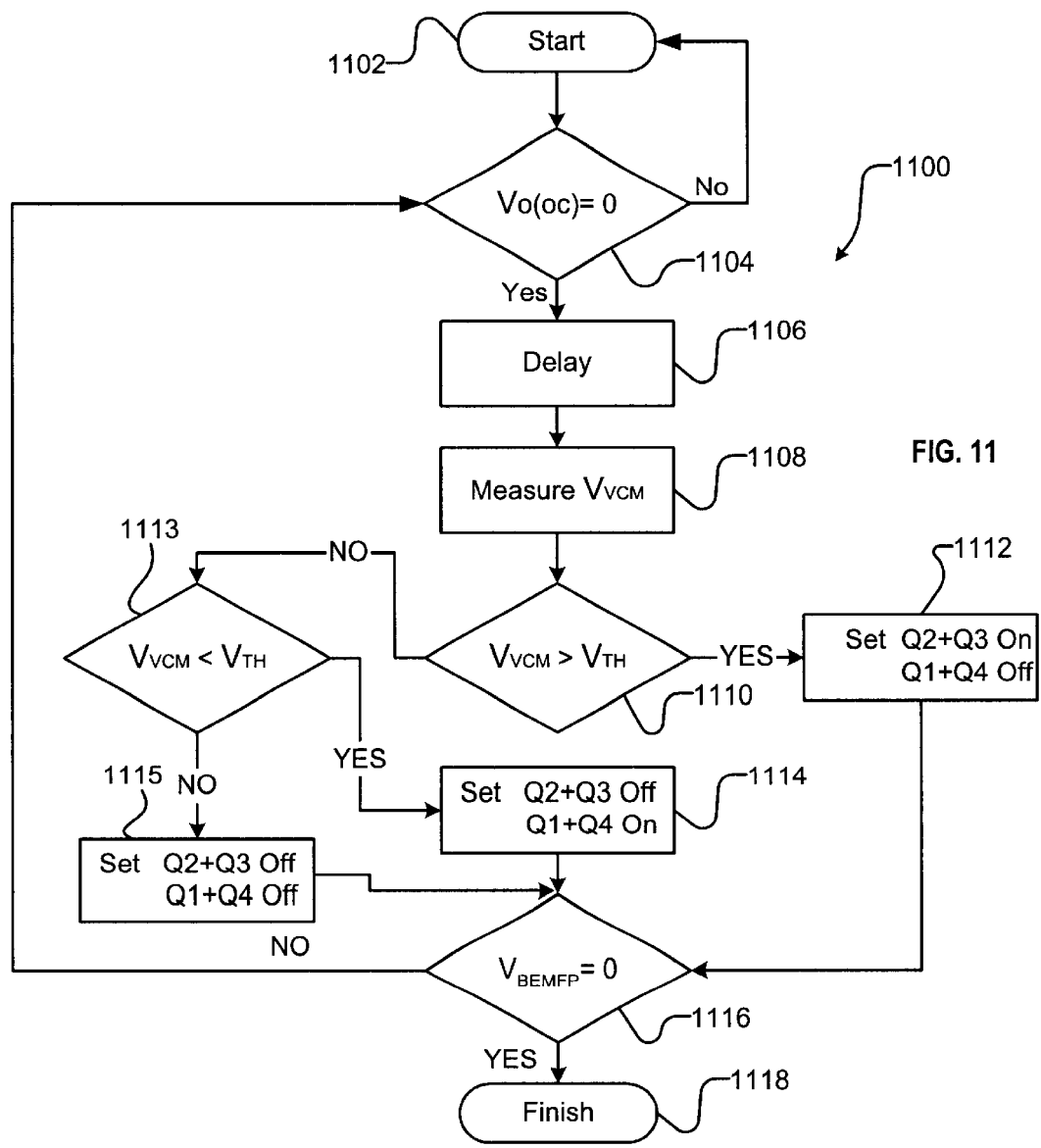
FIG. 11 is a flow diagram that illustrates operational characteristics for maintaining a constant retract velocity in accordance with an embodiment of the present invention.

FIG. 11 illustrates operations associated with a velocity control procedure 1100 detecting retract velocity of the actuator arms 114 of an actuator assembly 110 and controlling the retract velocity to maintain a constant retract velocity as the actuator arms 114, and thus the attached read/write heads 118, are retracted toward the OD 138 of the discs 108 at disc drive power down in accordance with an embodiment of the present invention. FIG. 10 shows a timing diagram 1000 illustrating magnitude phases of an open-circuit output voltage ($V_{o(oc)}$) at the output of the rectifier 160 against time in accordance with an embodiment of the present invention. Specifically, the open-circuit output voltage ($V_{o(oc)}$) comprises non-zero magnitude phases 1002, 1006,1010 and 1014 followed by zero magnitude phases 1004,1008 and 1012. For clarity, FIGS. 10 and 11 are described in tandem. The velocity control procedure 1100 comprises an operation flow beginning with start operation 1102 and concluding with termination operation 1118. Specifically, the velocity control procedure 1100 is a detailed explanation of operations associated with velocity detect operation 912, query operations 914, 915 and 919, deceleration operation 916 and acceleration operation 918 in accordance with an embodiment of the present invention. As such, the velocity control procedure 1100 is initiated following retract operation 910 by start operation 1102.

Once the velocity control procedure 1100 is initiated, operation flow passes to query operation 1104. Query operation 1104 determines whether the magnitude of the open-circuit output voltage ($V_{o(oc)}$) equals zero. If the magnitude of the open-circuit output voltage ($V_{o(oc)}$) is zero, then the magnitude of the control current applied to the retract system 162 via the current limiting resistor 602 is zero. Referring to FIG. 10, the magnitude of $V_{o(oc)}$ is zero at phases 1004, 1008 and 1012 and non-zero at phases 1002, 1006, 1010 and 1014. As such, the control current comprises a zero magnitude phases 1004, 1008 and 1012 and comprises non-zero magnitude phases 1002, 1006, 1010 and 1014. If the magnitude of $V_{o(oc)}$ does not equal zero, operation flow acts as a continuous loop executing query operation 1104 until a zero magnitude for $V_{o(oc)}$ is detected. Once the magnitude of $V_{o(oc)}$ equals zero, operation flow passes to delay operation 1106. Delay operation 1106 delays the operation flow for a predetermined time period, $T_d$, which may be measured in microseconds, in accordance with an embodiment of the present invention. Following the $T_d$ delay, operation flow passes to measure operation 1108. Measure operation 1108 measures the back EMF generated across the coil 126 ($V_{VCM}$) due to the variations in magnetic coupling within the coil 126 resulting from the movement of the actuator arms 114 toward the OD 138 of the discs 118. As described above, the back EMF generated from movement by the actuator arms 114 corresponds to the velocity of the read/write heads 118 retracting across the disc 118 and toward the OD 138.

Once $V_{VCM}$ is measured, operation flow passes to query operation 1110. Query operation 1110 compares the magnitude of $V_{VCM}$ to a threshold voltage ($V_{TH}$) in order to determine whether the rate at which the actuator arms 114 are retracted should be decelerated thereby decreasing the retract velocity of the actuator arms 114 toward the OD 138. If the magnitude of $V_{VCM}$ is greater than $V_{TH}$, operation flow passes to decelerate operation 1112. Decelerate operation 1112 sets FET's Q1 604 and Q4 608 off and FET's Q2 610 and Q3 606 on, thereby enabling the flow of current through the coil 126 with the current entering the coil 126 at the negative terminal 620 and leaving the coil 126 at the positive terminal 618. Current flow in this direction through the coil 126 generates an electric field around the coil 126 that interacts with the magnetic field surrounding the coil 126 to produce a deceleration force on the actuator assembly 110 thereby decreasing the retract velocity of the actuator arms 114, and thus the read/write heads 118, as they are moved toward the OD 138 of the disc 108.

If the magnitude of $V_{VCM}$ is not greater than $V_{TH}$, operation flow passes to query operation 1113. Query operation 1113 compares the magnitude of $V_{VCM}$ to the threshold voltage ($V_{TH}$) in order to determine whether the rate at which the actuator arms 114 are retracted should be accelerated thereby increasing the retract velocity of the actuator arms 114 toward the OD 138. If the magnitude of $V_{VCM}$ is less than $V_{TH}$, operation flow passes to accelerate operation 1114. Accelerate operation 1114 sets FET's Q1 604 and Q4 608 on and FET's Q2 610 and Q3 606 off, thereby enabling the flow of current through the coil 126 with the current entering the coil 126 at the positive terminal 618 and leaving the coil 126 at the negative terminal 620. Current flow in this direction through the coil 126 generates an electric field around the coil 126 that interacts with the magnetic field surrounding the coil 126 to produce an acceleration force on the actuator assembly 110 thereby increasing the retract velocity of the actuator arms 114, and thus the read/write heads 118, as they are moved toward the OD 138 of the disc 108.

If query operation 1113 determines that the magnitude of $V_{VCM}$ is not less than $V_{TH}$, operation flow passes to static operation 1115. Static operation 1115 sets FET's Q1 604 and Q4 608 off and FET's Q2 610 and Q3 606 off, thereby precluding current flow to the coil 126. As such, the H-bridge 622 acts as an open circuit to guarantee that an electric field is not generated around the coil 126, thereby maintaining the current retract velocity of the actuator arms 114, and thus the read/write heads 118, as they are moved toward the OD 138 of the disc 108. As such, the configuration of the states of the FET's 604, 608, 606 and 610, "off," make certain that neither a deceleration nor an acceleration force is applied to the actuator assembly 110.

Following deceleration operation 1112, acceleration operation 1114 and static operation 1115, operation flow passes to query operation 1116. Query operation 1116 determines whether the magnitude of $V_{BEMFP}$ has decreased to zero. As described above, the magnitude of $V_{BEMFP}$ decreases to zero at a time when kinetic energy is no longer produced by the rotation of the disc 108, i.e., when the disc 108 has stopped spinning. As such, when the magnitude of $V_{BEMFP}$ is zero, $V_{o(oc)}$ is forced to zero thereby nulling the flow of control current through the upper retract system node 612 and the current limiting resistor 602. As current through the upper retract system node 612 is nulled, the electrical energy used in retracting the actuator arms 114 is no longer supplied to the H-bridge 622 and the actuator arms 114 will begin to lose velocity across the disc 108, eventually stopping retraction altogether. If query operation 1116 determines that the magnitude of $V_{BEMFP}$ is zero, operation flow concludes with termination operation 1118. If however, query operation 1116 determines that the magnitude of $V_{BEMFP}$ is not zero, operation flow passes back to query operation 1104 and continues as previously discussed.

In summary, the present invention may be viewed as a method (such as in operation 800) for moving a read/write head (such as 118) across a surface of a rotating data storage disc (such as 108) in a disc drive (such as 100). The read/write head (such as 118) is attached to an actuator assembly (such as 110) and flies in close proximity to the surface of the data storage disc (such as 110). The method (such as in operation 800) includes a step of retracting (such as in operation 806) the read/write head (such as 118) from a first location (such as 306 or 304) on the surface of the data storage disc (such as 108) toward a second location (such as 306 or 120 and 121). The method (such as in operation 800) further includes steps of measuring (such as in operation 808) a retract velocity identifying a rate at which the read/write head (such as 118) is moved toward the second location (such as 306 or 120 and 121) and comparing (such as in operation 810) the retract velocity to a desired retract velocity. Responsive to the comparing step (such as in operation 810), if the retract velocity is less than the desired retract velocity, the method (such as in operation 800) includes a step of accelerating (such as in operation 814) the rate at which the read/write head (such as 118) is moved toward the second location (such as 306 or 120 and 121). In contrast, if the retract velocity is greater than the desired retract velocity, the method (such as in operation 800) includes a step of decelerating (such as in operation 816) the rate at which the read/write head (such as 118) is moved toward the second location (such as 306 or 120 and 121). The method (such as in operation 800) repeats the measuring step (such as in operation 808), the comparing step (such as in operation 810), the accelerating step (such as in operation 814) and the decelerating step (such as in operation 816) to maintain the retract velocity about the desired retract velocity. The desired retract velocity may be defined not only as a finite retract velocity of the read/write heads 118 retracting across the discs 108, but also as a selected velocity range to which the retract velocity is maintained between upper and lower limits of the selected velocity range. As such, in accordance with one embodiment, the read/write heads 118 are moved to the second location at a retract velocity that is between upper and lower limits of a desired retract velocity. Because the retract velocity is maintained between the upper and lower limits of the desired retract velocity, the retract velocity may be described as being maintained about the desired retract velocity.

In accordance with an embodiment wherein the method (such as in operation 800) is used during a normal operating mode of the disc drive 100, the first location may be an origination track (such as 306) on a data region (such as 304) of the data storage disc (such as 108) and the second location may be a destination track (such as 306) on the data region (such as 304) of the data storage disc (such as 108). In accordance with an embodiment wherein the method (such as in operation 800) is used during a disc drive power-down or power-save mode, the first location may be a data region (such as 304) on the surface of the data storage disc (such as 108) and the second location may be a non-data location (such as 120 or 121) on or in close proximity to the surface of the data storage disc (such as 108). In accordance with the latter embodiment, the method (such as in operation 800) may include a step of rectifying (such as in operation 804) current resulting from a rotational inertia in the data storage disc (such as 108) generated as the data storage disc (such as 108) continues spinning following disc drive (such as 100) power-down to produce a control current having one or more periods of non-zero magnitude phases (such as 1002, 1006, 1010 and 1014) with each non-zero magnitude phase (such as 1002, 1006, 1010 and 1014) being followed in time by a zero magnitude phase (such as 1004, 1008, 1012 and 1010). Thus, the method (such as in operation 800) may include a step of applying (such as in operation 910) the control current to a coil (such as 126) of a voice coil motor (such as 124) operably connected to the actuator arm (such as 114) to produce movement of the actuator arm (such as 114). Thus, the retracting step (such as in operation 806) may include applying (such as in operation 910) the control current through the coil (such as 126) in a first direction to generate an electric field around the coil (such as 126). The electric field interacts with a magnetic field of the voice coil motor (such as 124) such that the read/write head (such as 118) is moved toward the non-data location (such as 120 and 121). Furthermore, the accelerating step (such as in operation 814) may include applying (such as in operation 918) the control current through the coil (such as 126) in the first direction to generate an electric field around the coil (such as 126). The electric field generated as current flows through the coil (such as 126) in the first direction interacts with the magnetic field such that the rate at which the read/write head (such as 118) is moved toward the non-data location (such as 120 and 121) is accelerated. The decelerating step (such as in operation 816) may include a step of applying (such as in operation 916) the control current through the coil (such as 126) in a second direction opposite to the first direction to generate an electric field around the coil (such as 126). The electric field generated as current flows through the coil (such as 126) in the second direction interacts with the magnetic field such that the rate at which the read/write head (such as 118) is moved toward the non-data location (such as 120 and 121) is decelerated.

In further accordance with an embodiment of the invention wherein the method (such as in operation 800) is used during a disc drive power-down or power-save mode the measuring step (such as in operation 808) may include sampling (such as in operation 1108) a back electromotive force (such as $V_{VCM}$) across the coil (such as 126) of the voice coil motor (such as 124) motor during the one or more zero magnitude phases (such as 1004, 1008 and 1012) of the control current. The back electromotive force (such as $V_{VCM}$) represents the retract velocity of the read/writehead (such as 118) retracting toward the non-data location (such as 120 and 121). As such, the comparing step (such as in operation 1110) compares the back electromotive force (such as $V_{VCM}$) across the coil (such as 126) of the voice coil motor (such as 124) to a threshold voltage (such as $V_{TH}$) representative of the desired retract velocity.

In accordance with another embodiment of the present invention wherein the method (such as in operation 800) is used during a disc drive power-down or power-save mode; the read/write head (such as 118) may reach the non-data location (such as 120 and 121) at a time corresponding to a predefined magnitude of a back electromotive force (such as $V_{BEMF}$) generated by the rotational inertia in the rotating data storage disc (such as 108). Thus, the measuring step (such as in operation 808), the comparing step (such as in operation 810), the accelerating step (such as in operation 814) and the decelerating step (such as in operation 816) are repeated until the back electromotive force (such as $V_{BEMF}$) generated by the rotational inertia in the rotating data storage disc (such as 118) reaches the predefined magnitude.

In accordance with yet another embodiment of the present invention wherein the method (such as in operation 800) is used during a disc drive power-down or power-save mode, the non-data location may be a landing zone (such as 120) located on an outer diameter region (such as 138), an inner diameter region (such as 136) or a middle diameter region. The middle diameter region may be located on the data storage disc (such as 118) between the outer diameter (such as 138) and the inner diameter (such as 136). In accordance with yet another embodiment, the non-data location may be a load/unload ramp (such as 121) located in close proximity to an outer diameter (such as 138) on the data storage disc (such as 118).

In accordance with other embodiments, the present invention may be viewed as a program storage device readable by a computer system tangibly embodying a program of instructions executable by the computer system (such as 142) to perform a method of moving (such as in operation 800) a read/write head (such as 118) across a surface of a rotating data storage disc (such as 108) in a disc drive (such as 100). The read/write head (such as 118) is attached to an actuator assembly (such as 110) and flies in close proximity to the surface of the data storage disc (such as 108).

In accordance with one embodiment, the method (such as in operation 800) performed by the computer system (such as 142) includes a step of retracting (such as in operation 806) the read/write head (such as 118) from a data region (such as 304) on the surface of the data storage disc (such as 108) toward a non-data location (such as 120 and 121). The method (such as in operation 800) performed by the computer system (such as 142) further includes steps of measuring (such as in operation 808) a retract velocity identifying a rate at which the read/write head (such as 118) is moved toward the non-data location (such as 120 and 121) and comparing (such as in operation 810) the retract velocity to a desired retract velocity. Responsive to the comparing step (such as in operation 810), if the retract velocity is less than the desired retract velocity, the method (such as in operation 800) performed by the computer system (such as 142) includes a step of accelerating (such as in operation 814) the rate at which the read/write head (such as 118) is moved toward the non-data location (such as 120 and 121). In contrast, if the retract velocity is greater than the desired retract velocity, the method (such as in operation 800) includes a step of decelerating (such as in operation 816) the rate at which the read/write head (such as 118) is moved toward the non-data location (such as 120 and 121). The method (such as in operation 800) performed by the computer system (such as 142) repeats the measuring step (such as in operation 808), the comparing step (such as in operation 810), the accelerating step (such as in operation 814) and the decelerating step (such as in operation 816) until the read/write head (such as 118) reaches the non-data location (such as 120 and 121), thereby moving the read/write head (such as 118) from the data region (such as 304) to the non-data location (such as 120 and 121) at a constant velocity. As mentioned, the constant velocity may either a finite velocity or a velocity range to which the retract velocity is maintained between limits of the range.

In accordance with an embodiment, the method (such as in operation 800) performed by the computer system (such as 142) may include a step of rectifying (such as in operation 804) current resulting from a rotational inertia in the data storage disc (such as 108) generated as the data storage disc (such as 108) continues spinning following disc drive (such as 100) power-down. An output voltage (such as $V_o$) is generated by rectifying the current. As such, the method (such as in operation 800) may include steps of applying (such as in operation 910) the output voltage (such as $V_o$) across a current limiting resistor (such as 602) to induce a control current through the current limiting resistor (such as 602) and supplying (such as in operation 910) the control current to a coil (such as 126) of a voice coil motor (such as 124) operably connected to the actuator assembly (such as 110) to produce movement of the actuator assembly (such as 110). Thus, the retracting step (such as in operation 806) may include applying (such as in operation 910) the control current through the coil (such as 126) in a first direction to generate an electric field around the coil (such as 126). The electric field interacts with a magnetic field of the voice coil motor (such as 124) such that the read/write head (such as 118) is moved toward the non-data location (such as 120 and 121). Furthermore, the accelerating step (such as in operation 814) may include applying (such as in operation 918) the control current through the coil (such as 126) in the first direction to generate an electric field around the coil (such as 126). The electric field generated as current flows through the coil (such as 126) in the first direction interacts with the magnetic field such that the rate at which the read/write head (such as 118) is moved toward the non-data location (such as 120 and 121) is accelerated. The decelerating step (such as in operation 816) may include a step of applying (such as in operation 916) the control current through the coil (such as 126) in a second direction opposite to the first direction to generate an electric field around the coil (such as 126). The electric field generated as current flows through the coil (such as 126) in the second direction interacts with the magnetic field such that the rate at which the read/write head (such as 118) is moved toward the non-data location (such as 120 and 121) is decelerated.

In accordance with other embodiments, the present invention may be viewed as a retract system (such as 162) for retracting a read/write head (such as 118) from a data region (such as 304) on a surface of a data storage disc (such as 108) in a disc drive (such as 100) to a non-data location (such as 120 and 121) in the disc drive (such as 100). The read/write head (such as 118) is attached to an actuator assembly (such as 110) and flies in close proximity to the surface of the data storage disc (such as 108). The retract system (such as 162) may include an H-bridge circuit (such as 622) connected across a coil (such as 126) of a voice coil motor (such as 124) operably connected to the actuator assembly (such as 110) and directing a control current through the coil (such as 126) such that an electric field is generated around the coil (such as) 126. The electric field interacts with a magnetic field of the voice coil motor (such as 124) to move the read/write head (such as 118) to the non-data location (such as 120 and 121). The retract system (such as 162) may also include a control system (such as 700) receiving information representative of a retract velocity that identifies a rate at which the read/write head (such as 118) is moved toward the non-data location (such as 120 and 121). The control system (such as 700) may also compare the retract velocity to a desired retract velocity and, based on the comparison, apply the control current through the coil (such as 126) in a direction such that a mechanical force is applied to the actuator assembly (such as 110) that maintains the retract velocity at the desired retract velocity. A desired retract velocity may be either a finite velocity or a velocity range to which the retract velocity is maintained between limits of the range.

In accordance with one embodiment, the control system (such as 700) may apply the control current through the coil (such as 126) in a first direction if the retract velocity is less than the desired retract velocity thereby accelerating the rate at which the read/write head (such as 118) is moved toward the non-data location (such as 120 and 121). The control system (such as 700) may also apply the control current through the coil (such as 126) in a second direction, which is opposite to the first direction, if the retract velocity is greater than the desired retract velocity thereby decelerating the rate at which the read/write head (such as 118) is moved toward the non-data location (such as 120 and 121).

In accordance with an embodiment, the disc drive (such as 100) may include a spindle hub (such as 106) to which the data storage disc (such as 108) is attached. A spindle motor (such as 156) rotates the spindle hub (such as 106) at a rotational velocity. A back electromotive force (such as $V_{BEMF}$) is generated in the spindle motor (such as 156) due to the rotational inertia in the rotating data storage disc (such as 108) during disc drive (such as 100) power down. The back electromotive force (such as $V_{BEMF}$) generated by the spindle motor (such as 156) generates alternating currents that are rectified to produce the control current. As such, the retract system (such as 162) may apply the control current to a current limiting impedance (such as 602) operably coupled to the H-bridge circuit (such as 622). Furthermore, the control current may comprise one or more non-zero magnitude phases (such as 1002, 1006, 1010 and 1014) with each non-zero magnitude phase (such as 1002, 1006, 1010 and 1014) being followed in time by a zero magnitude phase (such as 1004, 1008, 1012 and 1010). As such, the control system (such as 700) may include a data acquisition device (such as 622 and 624) sampling a back electromotive force (such as $V_{VCM}$) across the coil (such as 126) of the voice coil motor (such as 124) as the control current is in a zero magnitude phase (such as 1004, 1008 and 1012). The back electromotive force (such as $V_{VCM}$) of the coil (such as 126) represents the retract velocity of the read/write head (such as 118) retracting toward the non-data location (such as 120 and 121). The control system (such as 700) may also include a comparator (such as 706) comparing the back electromotive force (such as $V_{VCM}$) across the coil (such as 126) of the voice coil motor (such as 124) to a threshold voltage representative of the desired retract velocity.

In accordance with an embodiment of the present invention, the control system (such as 700) may apply the control current through the coil (such as 126) in a first direction if the back electromotive force (such as $V_{VCM}$) across the coil (such as 126) is less than the threshold voltage thereby accelerating the rate at which the read/write head (such as 118) is moved toward the non-data location (such as 120 and 121). In particular, a mechanical force generated as the electric field and the magnetic field interact is applied to the actuator assembly (such as 110) to move the assembly (such as 110). The control system (such as 700) may apply the control current through the coil (such as 126) in a second direction opposite to the first direction if the back electromotive force (such as $V_{VCM}$) across the coil (such as 126) is greater than the threshold voltage (such as $V_{TH}$) thereby decelerating the rate at which the read/write head (such as 118) is moved toward the non-data location (such as 120 and 121). A mechanical force generated as the electric field and the magnetic field interact may be applied to the actuator assembly (such as 110) to move the assembly (such as 110) in accordance with one embodiment of the invention.

The retract system (such as 162) may comprise a second current limiting impedance (such as 603) operably connected to the H-bridge circuit (such as 622) and connected in parallel to the current limiting impedance (such as 602). The retract system (such as 162) may comprise an upper switching device (such as 605) coupled between an upper node (such as 612) of the H-bridge circuit (such as 622) and a voltage-to-motor source ($V_M$). The retract system may also comprise a lower switching device (such as 607) coupled between a lower node (such as 614) of the H-bridge circuit (such as 622) and ground (GND).

In accordance with yet other embodiments, the present invention may be viewed as a disc drive (such as 100) having a data storage disc (such as 108) mounted on a spindle hub (such as 106) rotably mounted to a base plate (such as 102), an actuator assembly (such as 110) mounted on the base plate (such as 102) adjacent the disc (such as 108) for moving a read/write head (such as 118) over the disc (such as 108), and a voice coil motor (such as 124) coupled to the actuator assembly (such as 110) and having a coil (such as 126). The disc drive (such as 100) may include a spindle motor (such as 156) rotating the spindle hub (such as 106) and the disc (such as 108) at a rotational velocity and generating a back electromotive force ($V_{BEMF}$) across windings (such as 502, 504 and 506) of the spindle motor (such as 156) as power is shut off to the spindle motor (such as 156) and the decreasing rotational velocity of the disc (such as 108) produces a rotational inertia in the disc (such as 108). The back electromotive force generates one or more alternating currents through the windings (such as 502, 504 and 506). The disc drive (such as 100) may also include a rectifier (such as 160) rectifying the one or more alternating currents and generating a voltage (such as $V_o$) and a retract system (such as 162). The retract system (such as 162) may include a current limiting impedance (such as 602 through which a control current enters an H-bridge circuit (such as 622) operably connected to the current limiting impedance (such as 602). The H-bridge circuit (such as 622) directs the control current through the coil (such as 126) such that an electric field is generated around the coil (such as 126). The electric field interacts with a magnetic field of the voice coil motor (such as 124) to move the read/write head (such as 118) to a non-data location (such as 120 and 121) at disc drive (such as 100) power-down. The retract system (such as 162) may further include a control system (such as 700) receiving information representative of a retract velocity identifying a rate at which the read/write head (such as 118) is moved toward the non-data location (such as 120 and 121). The control system (such as 700) may compare the retract velocity to a desired retract velocity and apply the control current through the coil (such as 126) in a direction such that a mechanical force is applied to the actuator assembly (such as 110) that maintains the retract velocity at the desired retract velocity. The desired retract velocity may be either a finite velocity or a velocity range to which the retract velocity is maintained between limits of the range.

In accordance with one embodiment, the control system (such as 700) may apply the control current through the coil (such as 126) in a first direction if the retract velocity is less than the desired retract velocity thereby accelerating the rate at which the read/write head (such as 118) is moved toward the non-data location (such as 120 and 121). The control system (such as 700) may also apply the control current through the coil (such as 126) in a second direction, which is opposite to the first direction, if the retract velocity is greater than the desired retract velocity thereby decelerating the rate at which the read/write head (such as 118) is moved toward the non-data location (such as 120 and 121).

In accordance with yet other embodiments, the present invention may be viewed as disc drive (such as 100) having a data storage disc (such as 108) mounted on a spindle motor hub (such as 106) rotably mounted to a base plate (such as 102). An actuator arm (such as 114) may be mounted on the base plate (such as 102) adjacent the disc (such as 108) for moving a transducer (such as 118) over the disc (such as 108). The transducer (such as 118) is preferably attached to a distal end of the actuator arm (such as 114) and flies in close proximity to a surface of the disc (such as 108). The disc drive (such as 100) may include a voice coil motor (such as 124) coupled to a proximal end of the actuator arm (such as 114) and have a coil (such as 126) through which a current flows to produce movement of the actuator arm (such as 114) across the surface of the disc (such as 108) and a retract control means (such as 162 and 700) for directing current through the coil (such as 126) of the voice coil motor (such as 124).

In accordance with an embodiment, the retract control means (such as 162 and 700) maintains a retract velocity of the transducer (such as 118) from a data region (such as 304) on the disc (such as 108) toward a non-data location (such as 120 and 121) about a desired retract velocity as the transducer (such as 118) is retracting following a disc drive power-down. The retract control means (such as 162 and 700) may include a generating means (such as 602) for producing the current, a means (such as 624 and 622) for detecting the retract velocity of the read/write head (such as 118) moving toward the non-data location (such as 102 and 121), a means (such as 706) for comparing the retract velocity to the desired retract velocity, and a means (such as 708 and 622) for applying the current through the coil (such as 126) in a direction to maintain the retract velocity about the desired retract velocity.

The applying means (such as 708 and 622) may apply the control current through the coil (such as 126) in a first direction if the retract velocity is less than the desired retract velocity to accelerate the transducer (such as 118) toward the non-data location (such as 120 and 121). Furthermore, the apply means (such as 708 and 622) may apply the control current through the coil (such as 126) in a second direction opposite to the first direction if the retract velocity is greater than the desired retract velocity to decelerate the transducer (such as 118) toward the non-data location (such as 120 and 121).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the present invention may be utilized to retract an actuator assembly from data regions on the disc to non-data locations at times other than disc drive power-down. For instance, the present invention may be used to retract the actuator assembly under power save conditions. Furthermore, the present invention may be used to retract an actuator assembly during normal operating conditions when the disc drive power is neither shut down nor under a power save condition.

In accordance with an alternative embodiment, the current limiting resistor 602 may be eliminated from the retract system 160 and one or more FET's 604, 606, 608 and 610 may be operated in the linear mode, thereby effectively using the FET's 604, 606, 608 and 610 of the H-bridge circuit 622 as variable resistors. When in the linear mode, an FET is operated such that the FET is in an operating state where the effective resistance of the FET is somewhere between as high as it can possibly be and as low as it can possibly be. Thus, rather than being used as a logic switch, the transistors are effectively transformed into variable resistor. To illustrate one embodiment, either Q1/Q4 or Q2/Q3 may be switched off while the other two are operated in the linear mode. As such, if Q1 and Q4 are switched off, then Q2 and Q3 may be operated in the linear mode. Such a configuration allows for control over the magnitude of the control current through the coil 126, thereby allowing control over the degree of displacement of the read/write heads 118 across the discs 108. In still another embodiment, the FET's 604, 606, 608 and 610 may be operated as switches and the current limiting resistor 602 may be replaced by a variable resistor to accomplish the same result.

Figure 12:
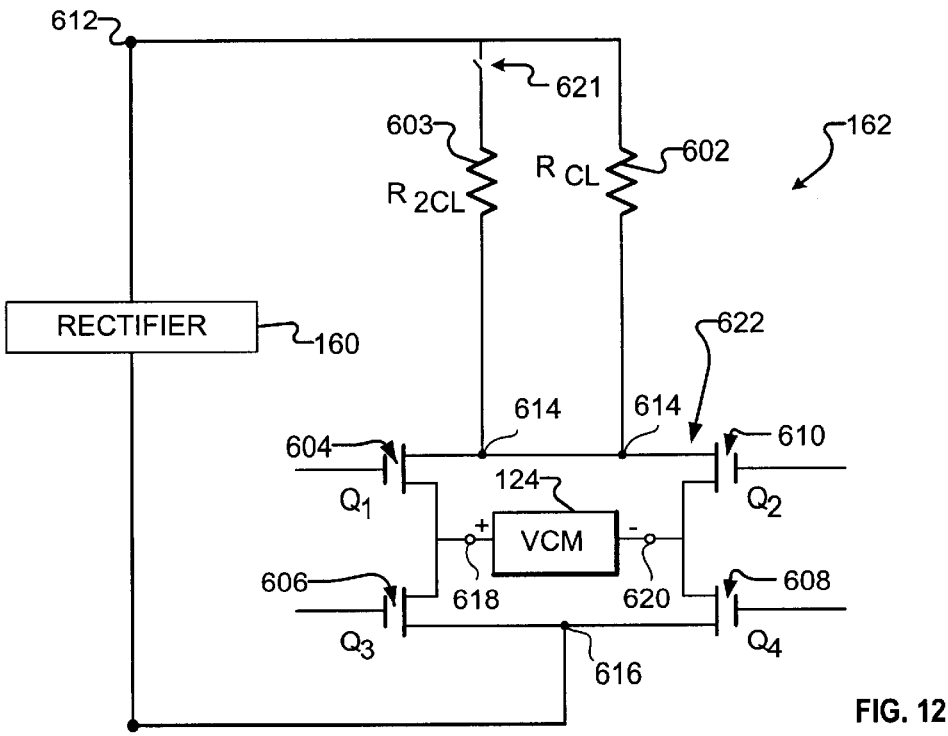
FIG. 12 is a retract system having multiple current limiting impedances in accordance with an alternative embodiment of the present invention.

In accordance with another alternative embodiment, the retract system 162 may include multiple current limiting impedances, which are described below for illustration purposes as resistances of multiple resistors. A retractor configuration comprising a total of two current limiting resistors between the H-bridge circuit 622 and the rectifier 160, which is located on the ASIC 152, is shown in FIG. 12, which depicts a second current limiting resistor 603 ($R_{2CL}$). The retract system may also include a switch 621 to connect or disconnect the second current limiting resistor 603 as desired during operation of the system 162. The resistance of the current limiting resistors 602, 603 may be chosen such that one is significantly larger in impedance than the other.

For example, $R_{2CL}$ may be defined by the following equation:

$$R_{2CL} = n^* R_{CL}$$ [Equation 2]

Furthermore, maximum acceleration may be obtained by selecting both resistors $R_{2CL}$ and $R_{CL}$ in parallel, resulting in minimum resistance. As such the parallel equivalent resistance may be defined by the following equation:

$$R_{MIN} = 1/(1/R_{CL} + 1/R_{2CL}) = n/(n+1)^* R_{2CL}$$ [Equation 3]

Selecting the resistance based on the measured velocity error may result reduction of the peak acceleration by a factor of (n+1). For example, a retract system 162 having two current limiting resistors 602, 603 may also employ a dual-comparator. Such a configuration may not only compare $V_{BEMF}$ for a decision on whether to accelerate or decelerate the actuator arms 114, but may also compare $V_{BEMF}$ to a window around $V_{TH}$. If $V_{BEMF}$ is within the specified window, then $R_{MAX}$, which may be defined by the following equation (Equation 4), may be chosen to reduce the pulse amplitude. Otherwise, $R_{MIN}$ may be chosen to accelerate or decelerate into the window.

$$R_{MAX} = n^* R_{CL}$$ [Equation 4]

Figure 13:
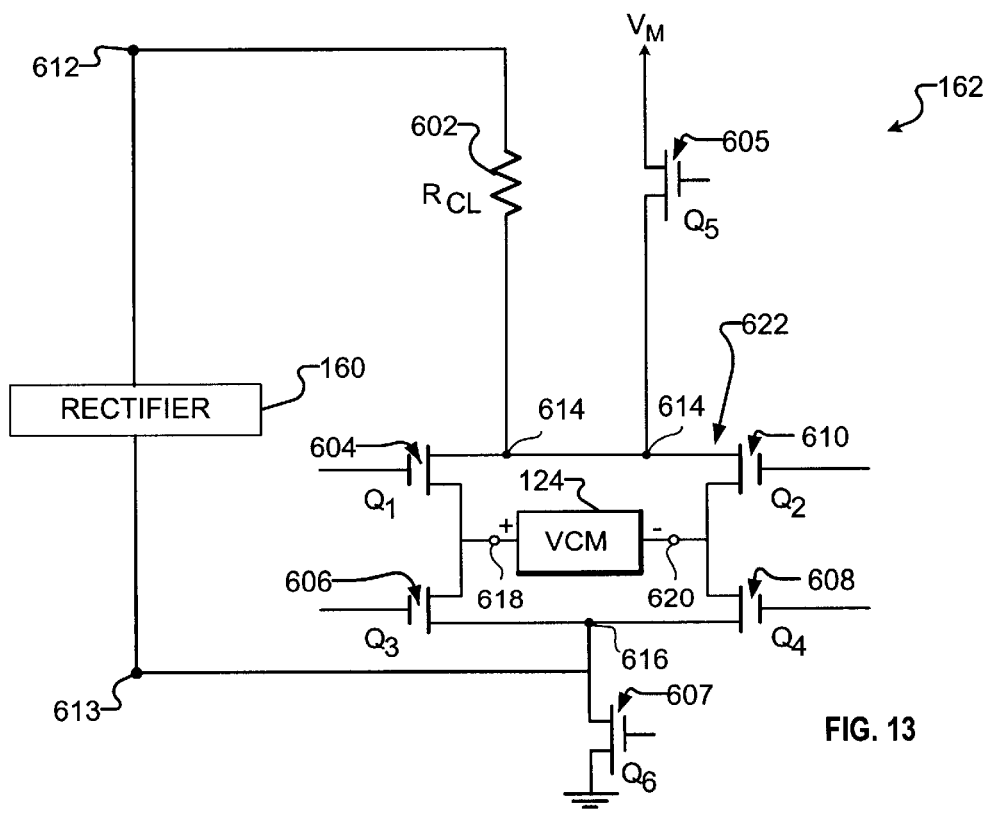
FIG. 13 is a retract system having an upper and a lower switching device in accordance with an alternative embodiment of the present invention.

In accordance with still another alternative embodiment, some or all of the retract system 162 components may be used not only under power-down or power save conditions of a disc drive 100, but also during normal operating modes of the disc drive 100. Such an embodiment is shown in FIG. 13. FIG. 13 shows a retract system 162 coupled across the rectifier 160 between the upper retract system node 612 and the lower retract system node 613. As such, an output voltage ($V_o$) is applied across the retract system 162 between the upper retract system node 612 and the lower retract system node 613 to supply a control current is supplied to the retract system 162 through the upper retract system node 612. The retract system 162, in accordance with this alternative embodiment, includes an H-bridge 622 containing identical components to the H-bridge 622 shown in FIG. 6. Additionally, the retract system 162 may include an upper switching device 605 and a lower switching device 607 to control whether some or all of the retract system 162 components used at disc drive power-down or during normal operating modes. As such, the upper switching device 605 and the lower switching device 607 may be added to allow certain retract system 162 components, such as the H-bridge 622, to be shared for use for other purposes other than head retract from data regions to non-data regions. For example, these components may be used during seek operations under normal operating modes of the disc drive 100. In an exemplary embodiment, and as hereafter described below, the upper switching device 605 may be a fifth field effect transistor (Q5) and the lower switching device 607 may be a sixth field effect transistor (Q6).

The state, i.e., on or off, of Q5 605 and Q6 607 determine whether the H-bridge 622 is used to displace the actuator arms 110 during power-down mode or normal operating modes. Q5 605 is coupled between the upper H-bridge node 614 of the H-bridge 622 and a voltage-to-motor source ($V_M$) used in controlling magnitude of displacement of the heads 118 across the disc during normal operating mode. Q6 607 is coupled between the lower H-bridge node 616 and ground (GND).

If the disc drive is in power-down mode, then the connection between the retract system 162 and the servo control system 150 may be open-circuited, thereby allowing the retract system 162 to retract the read/write heads 118 from data regions 304 to non-data locations. As such, Q5 605 and Q6 607 are switched off. Operation of the retract system 162 thus operates as described above. If however, the disc drive 100 is operating in a normal operating mode, Q5 605 and Q6 607 are switched on, thereby connecting the circuit between the servo control system 156 and the retract system 162. The voltage-to-motor source ($V_M$) thus controls the magnitude of current through the H-bridge 622, thereby controlling the degree of displacement and velocity of the heads 118 across the surface of the discs 108 as the heads 118 seek between tracks under control of the servo control system 156. Supply of current from the rectifier 160 and application of current to the H-bridge 622 operates as described above with the control current supplying the power to move the actuator arms 114 and the voltage-to-motor source ($V_M$) operating to control the magnitude of displacement.

Figure 14:
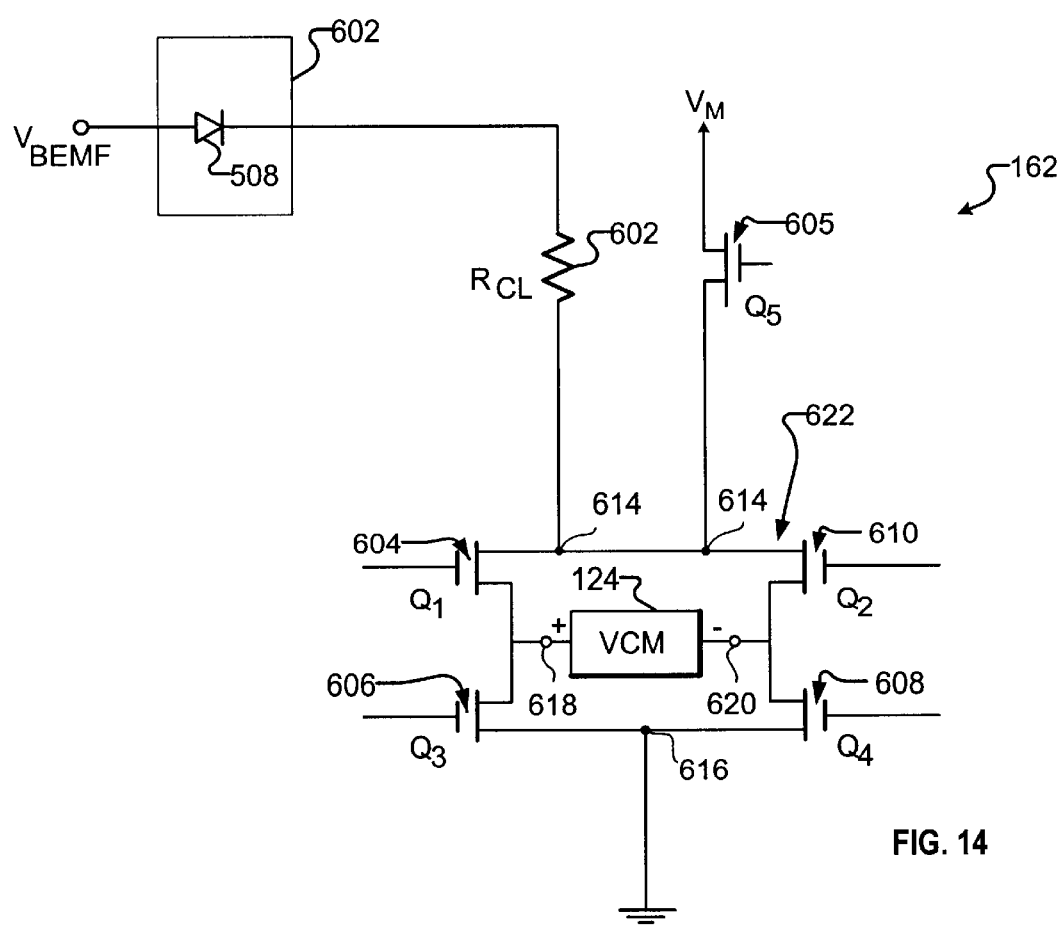
FIG. 14 is a retract system having an upper switching device and coupled to a rectifier having a single diode in accordance with an alternative embodiment of the present invention.

In yet a further alternative embodiment of the present invention, the retract system 162 may only contain an upper switching device 605, i.e., a fifth field effect transistor (Q5), as shown in FIG. 14. FIG. 14 shows a retract system 162 employing Q5 605 to retract the actuator arms 114 from data regions 304 to non-data locations during power-down or power-save modes of the disc drive 100. Furthermore, the rectifier 160 in this alternative embodiment contains only a single diode 508 coupled to a single phase of the spindle motor 156. The lower H-bridge node 616 of the retract system 162 in this alternative embodiment is shown coupled to ground (GND). Like the alternative embodiment shown in FIG. 13, the transistor Q5 605 is coupled between the upper H-bridge node 614 and a voltage-to-motor source ($V_M$). However, the retract system 162 shown in FIG. 14 may be used not only to move the actuator arms 114 during normal disc drive operating modes, but rather during power-down and power-save conditions. By employing the retract system 162 and rectifier 160 design in FIG. 14, the period of time, i.e., phase, that the control current is non-zero is longer, thereby producing a higher average control current applied to the retract system 162. Supply of the control current and application of the current to the retract system 162 is substantially identical to operations and illustrations described above. The alternative embodiment shown and illustrated in FIG. 14 is effectively a different retract scheme that may be more efficient in some respects to the retract system 162 previously described. Indeed, if future disc drive designs require greater current magnitudes to retract actuator arms 114 from data regions 304 to non-data locations, the embodiment of FIG. 14 may be an ideal design implementing the present invention.

Numerous other changes may be made which will readily suggest themselves to those skilled in the art and which are encompassed in the spirit of the invention disclosed and as defined in the appended claims.

What is claimed is:

1. A method for moving a read/write head across a surface of a rotating data storage disc in a disc drive, the read/write head being attached to an actuator arm and flying in close proximity to the surface of the data storage disc, the method comprising steps of:

(a) retracting the read/write head from a first location on the surface of the data storage disc toward a second location;

(b) measuring a retract velocity at which the read/write head is moving toward the second location;

(c) comparing the retract velocity to a desired retract velocity;

(d) if the retract velocity is less than the desired retract velocity, accelerating the read/write head toward the second location;

(e) if the retract velocity is greater than the desired retract velocity, decelerating the read/write head toward the second location; and (f) repeating the measuring step (b), the comparing step (c), the accelerating step (d) and the decelerating step (e) to maintain the retract velocity about the desired retract velocity, wherein the first location is a data region on the surface of the data storage disc and the second location is a non-data location on or in close proximity to the surface of the data storage disc and wherein the retracting step (a) comprises steps of:

(a)(i) rectifying current resulting from a rotational inertia in the data storage disc generated as the data storage disc continues spinning following a disc drive power-down to produce a control current having one or more periods of non-zero magnitude phases, each non-zero magnitude phase being followed in time by a zero magnitude phase; and (a)(ii) applying the control current to a coil of a voice coil motor operably connected to the actuator arm to produce movement of the actuator arm.

2. A method as defined in claim 1, wherein the applying step (a)(ii) comprises:

applying the one or more periods of non-zero magnitude phases of the control current through the coil in a first direction to generate an electric field around the coil, the electric field interacting with a magnetic field of the voice coil motor such that the read/write head is moved toward the non-data location.

3. A method as defined in claim 2, wherein the accelerating step (d) comprises:

applying the control current through the coil in the first direction.

4. A method as defined in claim 3, wherein the decelerating step (e) comprises:

applying the one or more periods of non-zero magnitude phases of the control current through the coil in a second direction opposite to the first direction.

5. A method as defined in claim 4, wherein the measuring step (b) comprises:

sampling a back electromotive force across the coil of the voice coil motor during the one or more zero magnitude phases of the control current, the back electromotive force being representative of the retract velocity.

6. A method as defined in claim 5, wherein the comparing step (c) compares the back electromotive force across the coil of the voice coil motor to a threshold voltage representative of the desired retract velocity.

7. A method as defined in claim 1, wherein the read/write head reaches the non-data location at a time corresponding to a predefined magnitude of a back electromotive force generated by the rotational inertia in the rotating data storage disc, the repeating step (f) comprising:

repeating the measuring step (b), the comparing step (c), the accelerating step (d) and the decelerating step (e) until the back electromotive force reaches the predefined magnitude.

8. A method as defined in claim 1, wherein the non-data location is a landing zone located on one of an outer diameter region, an inner diameter region and a middle diameter region, the middle diameter region being between the outer diameter region and the inner diameter region.

9. A method as defined in claim 1, wherein the non-data location is a load/unload ramp.

10. A method as defined in claim 1, wherein the retract velocity is maintained between an upper and a lower limit of a predetermined retract velocity range.

11. A retract system for retracting a read/write head from a data region on a surface of a data storage disc in a disc drive to a non-data location in the disc drive, the read/write head being attached to an actuator arm and flying in close proximity to the surface of the data storage disc, the retract system comprising:

an H-bridge circuit connected across a coil of a voice coil motor operably connected to the actuator arm and directing a control current comprising one or more non-zero magnitude phases, each non-zero magnitude phase being followed in time by a zero magnitude phase, through the coil such that an electric field is generated around the coil, the electric field interacting with a magnetic field of the voice coil motor to move the read/write head to the non-data location;

a control system receiving information representative of a retract velocity of the read/write head moving toward the non-data location, comparing the retract velocity to a desired retract velocity and applying the control current through the coil in a direction to maintain the retract velocity about the desired retract velocity.

12. A retract system as defined in claim 11, wherein the control system applies the control current through the coil in a first direction if the retract velocity is less than the desired retract velocity to accelerate the read/write head toward the non-data location.

13. A retract system as defined in claim 12, wherein the control system applies the control current through the coil in a second direction opposite to the first direction if the retract velocity is greater than the desired retract velocity to decelerate the read/write head toward the non-data location.

14. A retract system as defined in claim 11, wherein the disc drive includes a spindle hub to which the data storage disc is attached and a spindle motor rotating the spindle hub and the disc, the spindle motor generating one or more alternating currents during disc drive power-down, the alternating currents being rectified to produce the control current, the retract system further comprising:

a current limiting impedance operably coupled to the H-bridge circuit to assist in scaling the control current to a predetermined magnitude to be applied to the H-bridge circuit.

15. A retract system for retracting a read/write head from a data region on a surface of a data storage disc in a disc drive to a non-data location in the disc drive, the read/write head being attached to an actuator arm and flying in close proximity to the surface of the data storage disc, the retract system comprising:

an H-bridge circuit connected across a coil of a voice coil motor operably connected to the actuator arm and directing a control current through the coil such that an electric field is generated around the coil, the electric field interacting with a magnetic field of the voice coil motor to move the read/write head to the non-data location;

a control system receiving information representative of a retract velocity of the read/write head moving toward the non-data location, comparing the retract velocity to a desired retract velocity and applying the control current through the coil in a direction to maintain the retract velocity about the desired retract velocity, wherein the disc drive includes a spindle hub to which the data storage disc is attached and a spindle motor rotating the spindle hub and the disc, the spindle motor generating one or more alternating currents during disc drive power-down, the alternating currents being rectified to produce the control current, the retract system further comprising:

a current limiting impedance operably coupled to the H-bridge circuit to assist in scaling the control current to a predetermined magnitude to be applied to the H-bridge circuit, wherein the control current comprises one or more non-zero magnitude phases, each non-zero magnitude phase being followed in time by a zero magnitude phase, the control system comprising:

a data acquisition device sampling a back electromotive force across the coil of the voice coil motor during the one or more zero magnitude phases of the control current, the back electromotive force of the coil being representative of the retract velocity of the read/write head retracting toward the non-data location.

16. A retract system as defined in claim 15, wherein the control system comprises:

a comparison device comparing the back electromotive force across the coil of the voice coil motor to a threshold voltage representative of the desired retract velocity.

17. A retract system as defined in claim 16, wherein the control system applies the control current through the coil of the voice coil motor in a first direction if the back electromotive force across the coil is less than the threshold voltage to accelerate the read/write head toward the non-data location.

18. A retract system as defined in claim 17, wherein the control system applies the control current through the coil of the voice coil motor in a second direction opposite to the first direction if the back electromotive force across the coil is greater than the threshold voltage to decelerate the read/write head toward the non-data location.

19. A retract system as defined in claim 14 further comprising:

a second current limiting impedance operably connected to the H-bridge circuit and connected in parallel to the current limiting impedance.

20. A retract system as defined in claim 14 further comprising:

an upper switching device coupled between an upper node of the H-bridge circuit and a voltage-to-motor source.

21. A retract system as defined in claim 20 further comprising:

a lower switching device coupled between a lower node of the H-bridge circuit and ground.

22. A retract system as defined in claim 11, wherein the retract velocity is maintained within a predetermined range about the desired retract velocity.

23. A disc drive having a data storage disc mounted on a spindle motor hub rotably mounted to a base plate, an actuator arm mounted on the base plate adjacent the disc for moving a transducer over the disc, the transducer being attached to a distal end of the actuator arm and flying in close proximity to a surface of the data storage disc, the disc drive comprising:

a voice coil motor coupled to a proximal end of the actuator arm and having a coil through which current flows to produce movement of the actuator arm across the surface of the disc; and a retract control means for directing current comprising one or more non-zero magnitude phases, each non-zero magnitude phase being followed in time by a zero magnitude phase, through the coil of the voice coil motor to maintain a retract velocity of the transducer from a data region on the disc toward a non-data location about a desired retract velocity as the transducer is retracting following a disc drive power-down.

24. A disc drive as defined in claim 23, wherein the retract control means comprises:

a generating means for producing current;

means for detecting the retract velocity of the transducer moving toward the non-data location;

means for comparing the retract velocity to the desired retract velocity; and means for applying current through the coil in a direction to maintain the retract velocity about the desired retract velocity.

25. A disc drive as defined in claim 24, wherein the applying means applies current through the coil in a first direction if the retract velocity is less than the desired retract velocity to accelerate the transducer toward the non-data location.

26. A disc drive as defined in claim 25, wherein the applying means applies current through the coil in a second direction opposite to the first direction if the retract velocity is greater than the desired retract velocity to decelerate the transducer toward the non-data location.

27. A disc drive as defined in claim 23, wherein the retract velocity is maintained between an upper and a lower limit of a predetermined retract velocity range about the desired retract velocity.

* * * * *